(12) United States Patent
Kommula et al.

(10) Patent No.: US 10,756,967 B2
(45) Date of Patent: Aug. 25, 2020

(54) METHODS AND APPARATUS TO CONFIGURE SWITCHES OF A VIRTUAL RACK

(71) Applicant: VMware Inc., Palo Alto, CA (US)

(72) Inventors: Raja Kommula, Cupertino, CA (US); Raj Yavatkar, Saratoga, CA (US); Priyanka Tembey, San Francisco, CA (US)

(73) Assignee: VMware Inc., Palo Alto, CA (US)

( * ) Notice: Subject to any disclaimer, the term of this patent is extended or adjusted under 35 U.S.C. 154(b) by 13 days.

(21) Appl. No.: 15/655,632

(22) Filed: Jul. 20, 2017

(65) Prior Publication Data
US 2019/0028342 A1 Jan. 24, 2019

(51) Int. Cl.
*H04L 29/06* (2006.01)
*H04L 12/24* (2006.01)
(Continued)

(52) U.S. Cl.
CPC ...... *H04L 41/0813* (2013.01); *G06F 9/45558* (2013.01); *H04L 41/06* (2013.01);
(Continued)

(58) Field of Classification Search
CPC ..... H04L 47/36; H04L 47/10; H04L 12/4633; H04L 45/745; H04L 47/12; H04L 47/14;
(Continued)

(56) References Cited

U.S. PATENT DOCUMENTS 7,460,472 B2 * 12/2008 Le .................... H04L 1/0001
370/229
7,483,376 B2 * 1/2009 Banerjee ................ H04L 47/10
370/235
(Continued)

FOREIGN PATENT DOCUMENTS

WO 2016123293 8/2016

OTHER PUBLICATIONS

International Searching Authority, "International Search Report and Written Opinion," issued in connection with application No. PCT/US2018/043116, dated Oct. 18, 2018, 12 pages.
(Continued)

*Primary Examiner* — Sai Aung
(74) *Attorney, Agent, or Firm* — Hanley, Flight & Zimmerman, LLC

(57) ABSTRACT

Methods and apparatus to configure switches of a virtual rack are disclosed. An example apparatus includes a hardware switch implementing a virtual switch on a virtual communication network, a packet analyzer to analyze a packet captured at the hardware switch, the packet analyzer to determine whether the packet is indicative of a packet flow issue corresponding to a negative effect on transfer of one or more packet flows on the virtual communication network, an issue handler to, in response to the determination by the packet analyzer, determine a modification to a configuration of the hardware switch based on a configuration of the virtual configuration network, and a hardware configuration agent to modify the configuration of the hard-
(Continued)

ware switch based on the modification determined by the issue handler.

22 Claims, 14 Drawing Sheets

(51) Int. Cl.
    *G06F 3/0484*    (2013.01)
    *H04L 12/707*    (2013.01)
    *G06F 9/455*     (2018.01)
    *H04L 12/725*    (2013.01)
    *H04L 12/703*    (2013.01)
    *H04L 12/805*    (2013.01)
    *H04L 12/751*    (2013.01)
    *H04L 12/931*    (2013.01)

(52) U.S. Cl.
    CPC .............. *H04L 45/02* (2013.01); *H04L 45/24* (2013.01); *H04L 45/28* (2013.01); *H04L 45/302* (2013.01); *H04L 47/36* (2013.01); *H04L 63/00* (2013.01); *H04L 63/1458* (2013.01); *H04L 69/22* (2013.01); *G06F 2009/45591* (2013.01); *G06F 2009/45595* (2013.01); *H04L 49/70* (2013.01)

(58) Field of Classification Search
    CPC .............. H04L 47/263; H04L 12/4641; G06F 2221/2111; G06F 21/6218; G06F 21/604; G06F 21/72; G06F 21/335; G06F 21/54; G06F 2221/2101; G06F 2221/2137; G06F 2221/2143; G06F 3/04847; G06F 3/0482; G06F 3/0484; G06F 9/542
    See application file for complete search history.

(56) References Cited

U.S. PATENT DOCUMENTS

| | | | |
|---|---|---|---|
| 7,609,721 B2* | 10/2009 | Rao .................. | H04L 1/1854 370/470 |
| 7,640,292 B1 | 12/2009 | Smoot | |
| 8,121,135 B2* | 2/2012 | Thathapudi ............ | H04L 47/10 370/252 |
| 8,576,847 B2* | 11/2013 | Hegde ................... | H04L 43/10 370/392 |
| 2005/0041635 A1* | 2/2005 | Chung .................. | H04L 47/10 370/351 |
| 2005/0216693 A1 | 9/2005 | Craft et al. | |
| 2006/0080425 A1 | 4/2006 | Wood et al. | |
| 2008/0104252 A1 | 5/2008 | Henniger | |
| 2008/0320108 A1 | 12/2008 | Murty et al. | |
| 2009/0019515 A1 | 1/2009 | Excoffier et al. | |
| 2009/0262741 A1 | 10/2009 | Jungck et al. | |
| 2009/0292858 A1 | 11/2009 | Lambeth et al. | |
| 2011/0032935 A1* | 2/2011 | Yang .................. | H04L 47/10 370/389 |
| 2011/0302346 A1 | 12/2011 | Vahdat et al. | |
| 2012/0051236 A1* | 3/2012 | Hegde ................... | H04L 43/10 370/252 |
| 2012/0213070 A1 | 8/2012 | Lee et al. | |
| 2013/0044748 A1 | 2/2013 | Shah et al. | |
| 2013/0124702 A1 | 5/2013 | Shah et al. | |
| 2013/0145072 A1 | 6/2013 | Venkataraghavan | |
| 2013/0223454 A1 | 8/2013 | Dunbar et al. | |
| 2014/0050217 A1 | 2/2014 | Janakiraman et al. | |
| 2014/0164640 A1* | 6/2014 | Ye ........................ | H04L 47/12 709/235 |
| 2014/0241203 A1 | 8/2014 | Elson | |
| 2014/0372616 A1 | 12/2014 | Arisoylu et al. | |
| 2015/0043379 A1 | 2/2015 | Shimokuni et al. | |
| 2015/0071067 A1 | 3/2015 | Martin et al. | |
| 2015/0071072 A1 | 3/2015 | Ratzin et al. | |
| 2015/0078152 A1 | 3/2015 | Garg et al. | |
| 2015/0092561 A1 | 4/2015 | Sigoure | |
| 2015/0163117 A1 | 6/2015 | Lambeth et al. | |
| 2015/0277952 A1 | 10/2015 | Lin et al. | |
| 2016/0065423 A1 | 3/2016 | Zhang | |
| 2016/0072642 A1 | 3/2016 | Shih | |
| 2016/0105343 A1 | 4/2016 | Janarthanan et al. | |
| 2016/0105364 A1 | 4/2016 | Kanonakis et al. | |
| 2016/0283259 A1 | 9/2016 | Mehta | |
| 2017/0149880 A1 | 5/2017 | Lochhead et al. | |
| 2017/0163539 A1 | 6/2017 | Sreeramoju et al. | |
| 2017/0195226 A1* | 7/2017 | Cho ..................... | H04L 45/586 |
| 2017/0244651 A1 | 8/2017 | Saxton | |
| 2017/0286167 A1 | 10/2017 | Zhu | |
| 2017/0331740 A1 | 11/2017 | Levy et al. | |
| 2017/0353874 A1 | 12/2017 | Harrang et al. | |
| 2017/0366401 A1 | 12/2017 | Jiang et al. | |
| 2018/0004558 A1 | 1/2018 | Das Sharma | |
| 2018/0013583 A1 | 1/2018 | Rubenstein et al. | |
| 2018/0026895 A1 | 1/2018 | Wang et al. | |
| 2018/0091591 A1 | 3/2018 | Puri et al. | |
| 2018/0097734 A1 | 4/2018 | Boutros et al. | |
| 2018/0139101 A1 | 5/2018 | Puri | |
| 2018/0183683 A1 | 6/2018 | Geng et al. | |
| 2018/0241664 A1* | 8/2018 | Singh ..................... | H04L 45/38 |
| 2018/0316618 A1 | 11/2018 | Brown et al. | |
| 2018/0343162 A1 | 11/2018 | Ohsuga | |
| 2018/0359131 A1 | 12/2018 | Cheng et al. | |
| 2018/0373553 A1 | 12/2018 | Connor et al. | |
| 2019/0028345 A1 | 1/2019 | Kommula et al. | |
| 2019/0028382 A1 | 1/2019 | Kommula et al. | |
| 2019/0028400 A1 | 1/2019 | Kommula et al. | |

OTHER PUBLICATIONS

United States Patent and Trademark Office, "Non-Final Office Action," issued in connection with U.S. Appl. No. 15/655,193, dated Jan. 29, 2019, 31 pages.

United States Patent and Trademark Office, "Non-Final Office Action," issued in connection with U.S. Appl. No. 15/655,625, dated Feb. 26, 2019, 202 pages.

United States Patent and Trademark Office, "Non-Final Office Action," dated Apr. 11, 2019 in connection with U.S. Appl. No. 15/655,197 (37 pages).

United States Patent and Trademark Office, "Final Office Action," dated Jul. 22, 2019 in connection with U.S. Appl. No. 15/655,193 (15 pages).

United States Patent and Trademark Office, "Notice of Allowance," issued in connection with U.S. Appl. No. 15/655,197, dated Aug. 30, 2019, 8 pages.

United States Patent and Trademark Office, "Final Office Action," issued in connection with U.S. Appl. No. 15/655,625, dated Sep. 4, 2019, 28 pages.

United States Patent and Trademark Office, "Non-Final Office Action," issued in connection with U.S. Appl. No. 15/655,193 dated Dec. 26, 2019, 23 pages.

* cited by examiner

1050

1052 { SWITCH_LIST = { SET OF SWITCHES IN VCF }

1054 {
FOREACH S IN SWITCH_LIST
    FOREACH R IN ROUTING TABLE OF S

1056 {
        SUBNET = NETWORK OF R
        NEXTHOP = NEXTHOP OF R

1060 {         IF VALIDATE_ROUTE(SUBNET, NEXTHOP) == FAILURE
1062 {             RETURN FAILURE
        ENDIF
    ENDFOR
ENDFOR

1064 { RETURN SUCCESS

1058 {
VALIDATE_ROUTE(SUBNET, NEXTHOP)
{
IF NEXTHOP IS IN VCF
    LOGIN TO SWITCH WITH NEXTHOP AS IP ADDRESS
    R = READ ROUTE FOR SUBNET
    IF R IS NOT PRESENT
        RETURN FAILURE
    ENDIF
    VALIDATE_ROUTE (SUBNET OF R, NEXTHOP OF R)
ENDIF
RETURN SUCCESS
}

FIG. 10B

METHODS AND APPARATUS TO CONFIGURE SWITCHES OF A VIRTUAL RACK

FIELD OF THE DISCLOSURE

The present disclosure relates generally to cloud computing and, more particularly, to methods and apparatus to configure and manage resources of software defined data centers.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 10B is pseudo-code representative of example machine readable instructions that may be executed to validate switch configurations.

Figure 1:
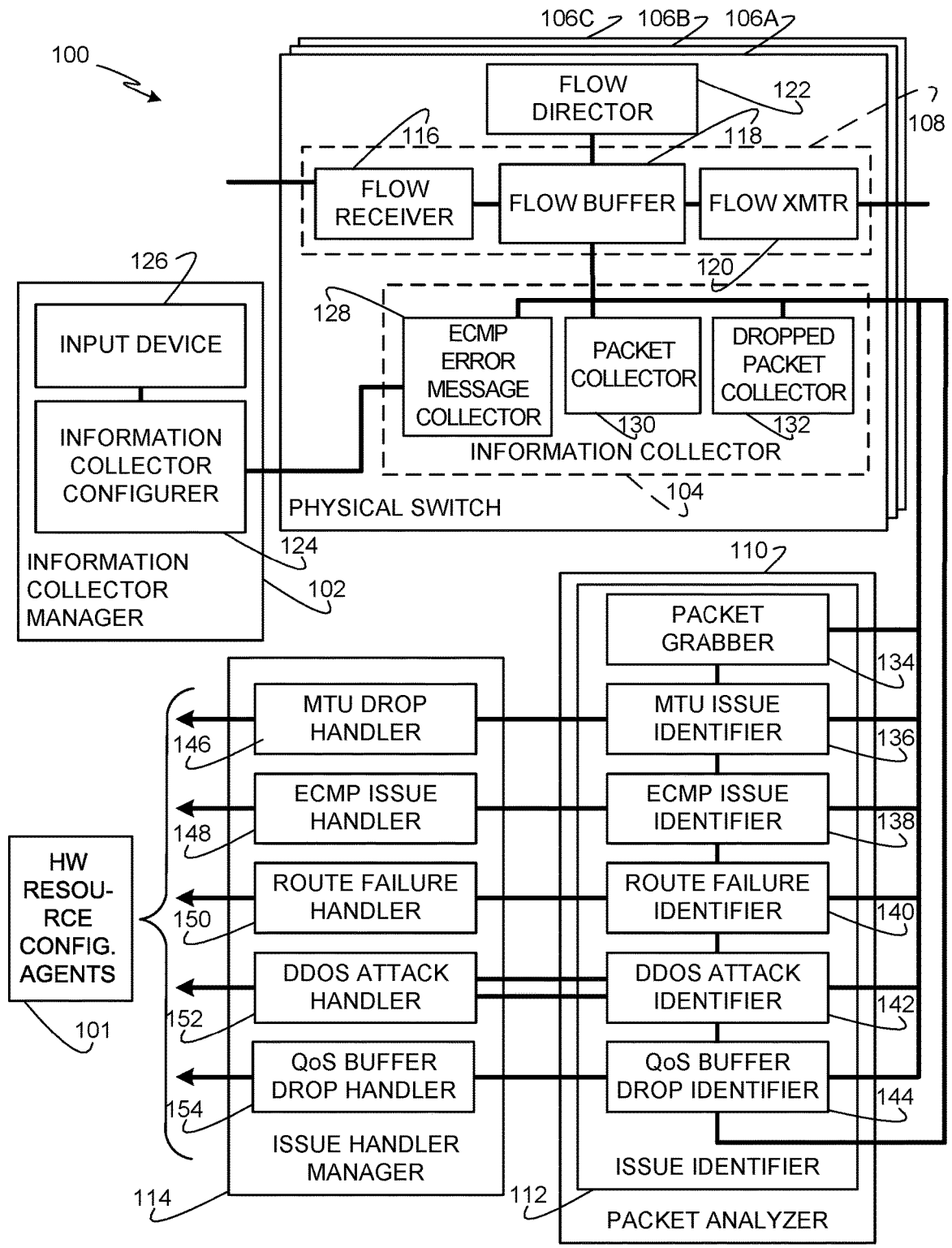
FIG. 1 is an example hardware resource configuration system in accordance with the teachings of this disclosure to modify example physical rack resources that implement an example virtual server rack deployment.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Cloud computing is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environment are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Prior converged and hyper-converged systems enable deploying and operating private clouds by offering an integrated system. However, most of such prior products lack a single governing entity that has visibility into and end-to-end control over an entire (virtual and physical) infrastructure. The lack of a single governing entity makes it difficult to correlate related events such as relating switch congestion to a particular traffic source in a VM, or taking preemptive traffic management action (e.g., a scheduled VM migration event could be used to proactively select an end-to-end network path that does not impact the software-defined data storage traffic), or reflecting network I/O control (NIOC) (e.g., VMWARE ESXI NIOC) configurations at the switch level for end-to-end Quality of Storage (QoS) control during traffic events like software-defined data storage rebalancing. Examples disclosed herein overcome limitations of prior systems by enabling observing and controlling both virtual and physical infrastructures of self-contained private clouds. Examples disclosed herein collect telematics data from switches, hosts, and hypervisor-based virtual infrastructure and take remedial actions based on telematics analyses and user configured policies.

Figure 2:
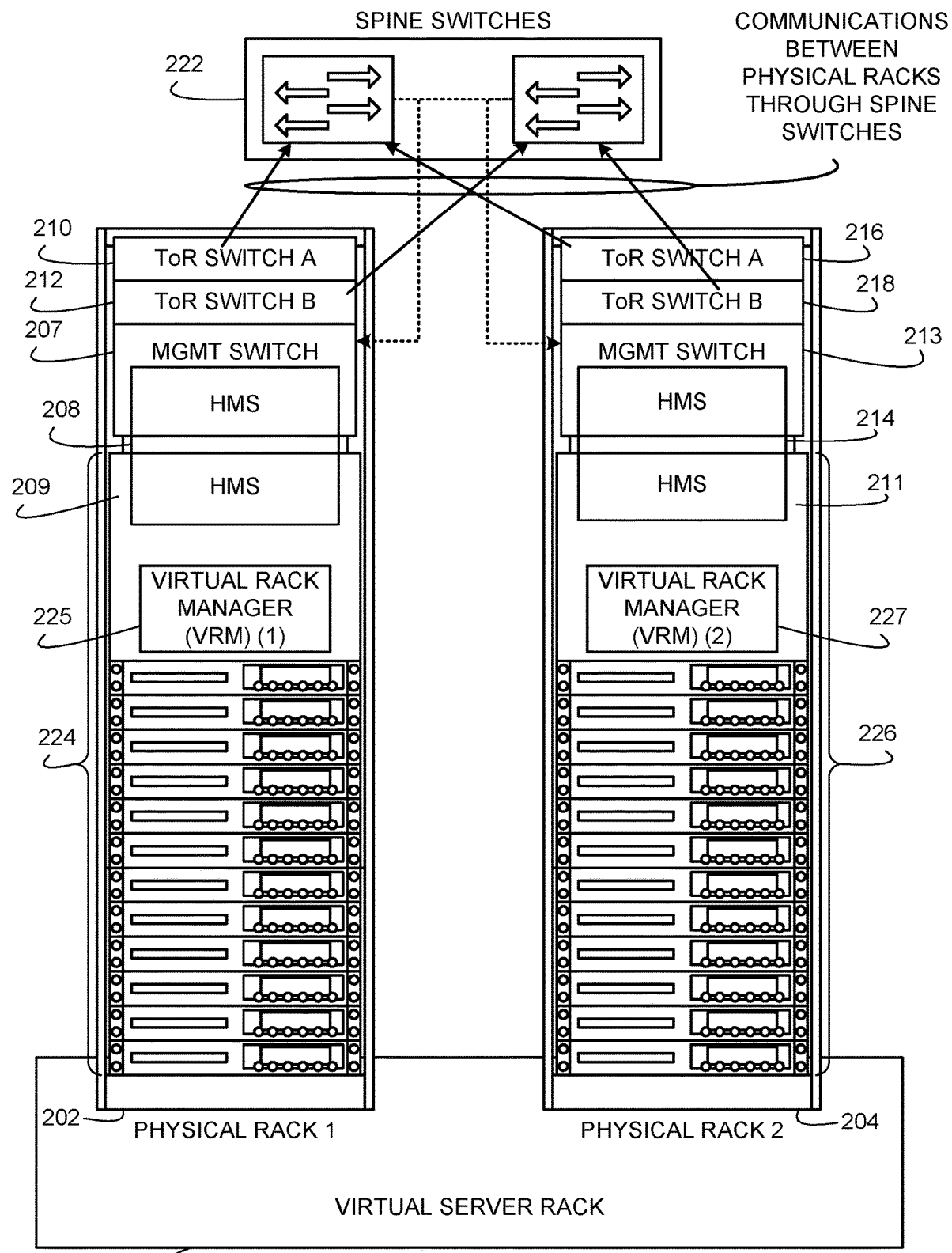
FIG. 2 depicts example physical racks in the example virtual server rack deployment.

Examples disclosed herein may be employed with HCI-based SDDCs deployed using virtual server rack systems such as the virtual server rack 206 of FIG. 2. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 2 and 3, multi-rack deployments can include Top-of-the-Rack (ToR) switches (e.g., leaf switches) and spine switches connected using a Leaf-Spine architecture. A virtual server rack system also includes software-defined data storage (e.g., storage area network (SAN), VMWARE® VIRTUAL SAN™) distributed across multiple hosts for redundancy and virtualized networking software (e.g., VMWARE NSX™).

A drawback of some virtual server rack systems is that different hardware components located therein can be procured from different equipment vendors, and each equipment vendor can have its own independent OS (OS) installed on its hardware. For example, physical hardware resources include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration may require additional network bandwidth, which may not be released until the reconfiguration is complete.

Examples disclosed herein provide HCI-based SDDCs with system-level governing features that can actively monitor and manage different hardware and software components of a virtual server rack system even when such different hardware and software components execute different OSs. As described in connection with FIG. 3, major components of a virtual server rack system include a hypervisor, network virtualization software, storage virtualization software (e.g., software-defined data storage), a physical network OS, and external storage. In some examples, the storage virtualization (e.g., VMWARE VIRTUAL SAN™) is integrated with the hypervisor. In examples in which the physical network OS is isolated from the network virtualization software, the physical network is not aware of events occurring in the network virtualization environment and the network virtualization environment is not aware of events occurring in the physical network.

Examples disclosed herein improve the configuration of hardware resources in a virtual environment by providing a virtual server rack that includes a hardware management system. The hardware management system is able to access and analyze primitive, low-level packet flow information and, based on such information, identify issues that negatively affect one or more packet flows through the virtual server rack. When such issues are identified, the hardware management system reconfigures the hardware resources that support the virtual environment in a manner that improves the operation and performance of the virtual rack server. In some examples, the hardware management system determines, based on the primitive low-level packet flow information, that one or more high-level events (e.g., events occurring in the virtual environment) are occurring (or are going to occur in the virtual network) and reconfigures the hardware resources to improve the operations/performance of the virtual network.

FIG. 1 is an example hardware resource configuration system 100 in accordance with the teachings of this disclosure to configure hardware and/or software resources that implement an example virtual computing environment. The example hardware resource configuration system 100 of the illustrated example includes an example information collector manager 102 to manage an example information collector 104 in a switch 106A. Additional switches (e.g., switches 106B, 106C) can include the same components as the switch 106A. The operation of the example hardware resource configuration system 100 is described with respect to the switch 106A, but is equally applicable to the switches 106B and 106C. The switches 106A-C can be implemented using ToR switches and/or spine switches of a physical server rack (see FIG. 2).

Information collected by the example information collector 104 includes primitive, low-level data associated with a packet flow channel 108 through the switch 106A. Although a single packet flow channel 108 is illustrated in the example of FIG. 1, the switch 106A can be configured to include multiple flow channels, and/or the information collector 104 can be configured to collect data from all or some of the multiple flow channels. The primitive, low-level data can include Equal Cost Multi-Path (ECMP) error messages, any and/or all the packets flowing through the switch 106A, packets dropped at the switch 106A, etc. The example information collector 104 supplies the collected information to an example packet analyzer 110 that includes an example issue identifier 112. The example issue identifier 112 analyzes the information collected by the information collector 104 to identify one or more flow issues that are negatively affecting the packet flow channel 108. In some examples, the flow issues are indicative of a need to reconfigure one or more hardware resources (e.g., one of the switches 106A-C) and/or software resources of the virtual computing environment. In some examples, the flow issues affecting the packet flow channel 108 are related to any of a Maximum Transmission Unit (MTU) being exceeded, an ECMP error, a route failure, a distributed denial of service attack (DDoS), packets dropped from a Quality of Service buffer, etc. In some examples, the packet analyzer 110 upon identifying such a flow issue, transmits information regarding the flow issue to an example issue handler manager 114. The example issue handler manager 114 uses the information supplied by the packet analyzer 112 to determine one or more reconfiguration operations to be performed on one or more of the hardware and/or software resources of the virtual environment and thereby ameliorate the identified flow issue. In some examples, the issue handler manager 114 directs an example hardware resource configuration agent 101 to perform the one or more hardware resource configuration operations.

In some examples, the packet flow channel 108 includes an example flow receiver 116, an example flow buffer(s) 118, and an example flow transmitter 120. A packet included in a packet flow in the packet flow channel 108 is transmitted via the switch 106A is received at the flow receiver 116 and held in the flow buffer(s) 118. While in the flow buffer(s) 118, an example flow director 122 operates on the packet to identify parameters of the packet contained in various fields of the packet and to identify a destination based on the parameters. In some examples, the flow director 122 modifies the packet as needed to ensure that the packet reaches the destination (the destination may include a final destination or a next hop). After the packet is modified, the flow transmitter 120 transmits the packet to the destination.

In some examples, an example information collector configurer 124 of the example information collector manager 102 receives a set of example information collection configuration parameters (e.g., ECMP errors, packet information, dropped packet information). The information collection configuration parameters, which can be entered at an example user input device 126, specify types of information to be collected by the example information collector 104. The information collector configurer 124 uses the information collection configuration parameters to configure the information collector 104. In some examples, the information collection configurer 124 configures the information collector 104 to include an example ECMP error message collector 128 to collect ECMP error messages received in the packet flow channel 108, an example packet collector 130 to collect packets received in the packet flow channel 108, and an example dropped packet collector 132 to collect all packets that are dropped from the packet flow channel 108.

In the example of FIG. 1, the example information collector 104 transmits the collected information (e.g., the ECMP error messages, the packets, and the dropped packets) from the example switch 106A to the example packet analyzer 110. The collected information is received at the example issue identifier 112 of the example packet analyzer 110. The example issue identifier 112 includes an example packet grabber 134 to grab the packets/information received from the information collector 104, and a set of issue identifiers (e.g., an example MTU issue identifier 136, an example ECMP issue identifier 138, an example route failure identifier 140, an example DDoS attack identifier 142, an example QoS buffer drop identifier 144, etc.). The example packet grabber 134 delivers the packet(s) received from the information collector 104 to the issue identifiers (e.g., using the MTU issue identifier, the ECMP issue identifier 138, the route failure identifier 140, the DDoS attack identifier 142, the QoS buffer drop identifier 144, etc.). Each issue identifier, in turn, evaluates the information to determine whether a corresponding issue (e.g., an MTU has been exceeded, an ECMP error has occurred, a route failure has occurred, a DDoS attacks is occurring, a QoS buffer drop has occurred, etc.) is negatively affecting the packet flow. When any of the issue identifiers (e.g., the MTU issue identifier 136, the ECMP issue identifier 138, the route failure identifier 140, the DDoS attack identifier 142, the QoS buffer drop identifier 144, etc.) identifies an issue, the issue identifier(s) cause the evaluated information (e.g., packet or error message information) to be transmitted to a corresponding one of a set of issue handlers (e.g., an example MTU drop handler 146, an example ECMP issue handler 148, an example route failure handler 150, an example DDoS attack handler 152, an example QoS buffer drop handler 154, etc.) of the example issue handler manager 114. The corresponding issue handler (e.g., the MTU drop handler 146, the ECMP issue handler 148, the route failure handler 150, the DDoS attack handler 152, or the QoS buffer drop handler 154) responds to the evaluated information by causing one or more example hardware resource configuration agents 101 to perform one or more operations affecting the example hardware and/or software resources of the virtual environment, as described in further detail below.

FIG. 2 depicts example physical racks 202, 204 in an example deployment of a virtual server rack 206. The virtual server rack 206 of the illustrated example enables abstracting hardware resources (e.g., physical hardware resources 224, 226). In some examples, the virtual server rack 206 includes a set of physical units (e.g., one or more racks) with each unit including hardware such as server nodes (e.g., compute+storage+network links), network switches, and, optionally, separate storage units. From a user perspective, the example virtual server rack 206 is an aggregated pool of logic resources exposed as one or more VMWARE ESXI™ clusters along with a logical storage pool and network connectivity. In examples disclosed herein, a cluster is a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 202 has an example ToR switch A 210, an example ToR switch B 212, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node (0) 211. In the illustrated example, the management switch 213 and the server host node (0) 211 run an HMS 214 for the second physical rack 204. In some examples, the switches 106A-C are implemented using any of the ToR switch A 210, the ToR switch A 216, the ToR switch B 212, the ToR switch B 218, and/or the spine switch 212.

In the illustrated example, the HMS 208, 214 connects to server management ports of the server host node(0) 209, 211 (e.g., using a baseboard management controller (BMC)), connects to ToR switch management ports (e.g., using 1 gigabits per second (Gbps) links) of the ToR switches 210, 212, 216 and 218, and also connects to spine switch management ports of one or more spine switches 222. In the illustrated example, the ToR switches 210, 212, 216 and 218, implement leaf switches such that the ToR switches 210, 212, 216 and 218, and the spine switches 222 are in communication with one another in a leaf-spine switch configuration. These example connections form a non-routable private Internet protocol (IP) management network for out-of-band (OOB) management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 210, 212, 216 and 218 and to the spine switch management ports of the one or more spine switches 222 for switch management. In examples disclosed herein, the ToR switches 210, 212, 216 and 218 connect to server NIC ports (e.g., using 10 Gbps links) of server hosts in the physical racks 202, 204 for downlink communications and to the spine switch(es) 222 (e.g., using 40 Gbps links) for uplink communications. In the illustrated example, the management switch 207, 213 is also connected to the ToR switches 210, 212, 216 and 218 (e.g., using a 10 Gbps link) for internal communications between the management switch 207, 213 and the ToR switches 210, 212, 216 and 218. Also in the illustrated example, the HMS 208, 214 is provided with in-band (IB) connectivity to individual server nodes (e.g., server nodes in example physical hardware resources 224, 226) of the physical rack 202, 204. In the illustrated example, the IB connection interfaces to physical hardware resources 224, 226 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 208, 214 include discovery of new hardware, bootstrapping, remote power control, authentication, hard resetting of non-responsive hosts, monitoring catastrophic hardware failures, and firmware upgrades. The example HMS 208, 214 uses IB management to periodically monitor status and health of the physical resources 224, 226 and to keep server objects and switch objects up to date. Example IB operations performed by the HMS 208, 214 include controlling power state, accessing temperature sensors, controlling Basic Input/Output System (BIOS) inventory of hardware (e.g., central processing units (CPUs), memory, disks, etc.), event monitoring, and logging events.

The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, NICs, servers, switches, storage devices, peripherals, power supplies, rack 202 runs on a cluster of three server host nodes of the first physical rack 202, one of which is the server host node(0) 209. In some examples, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the VRM 227 of the second physical rack 204 runs on a cluster of three server host nodes of the second physical rack 204, one of which is the server host node(0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216 and 218 of the physical racks 202, 204 through the one or more spine switches 222. In the illustrated example, each of the ToR switches 210, 212, 216 and 218 is connected to each of two spine switches 222. In other examples, fewer or more spine switches may be used. For example, additional spine switches may be added when physical racks are added to the virtual server rack 206.

The VRM 225 of the first physical rack 202 runs on a cluster of three server host nodes of the first physical rack 202 using a high availability (HA) mode configuration. In addition, the VRM 227 of the second physical rack 204 runs on a cluster of three server host nodes of the second physical rack 204 using the HA mode configuration. Using the HA mode in this manner, enables fault tolerant operation of the VRM 225, 227 in the event that one of the three server host nodes in the cluster for the VRM 225, 227 fails. Upon failure of a server host node executing the VRM 225, 227, the VRM 225, 227 can be restarted to execute on another one of the hosts in the cluster. Therefore, the VRM 225, 227 continues to be available even in the event of a failure of one of the server host nodes in the cluster.

In examples disclosed herein, a CLI and APIs are used to manage the ToR switches 210, 212, 216 and 218. For example, the HMS 208, 214 uses CLI/APIs to populate switch objects corresponding to the ToR switches 210, 212, 216 and 218. On HMS bootup, the HMS 208, 214 populates initial switch objects with statically available information. In addition, the HMS 208, 214 uses a periodic polling mechanism as part of an HMS switch management application thread to collect statistical and health data from the ToR switches 210, 212, 216 and 218 (e.g., Link states, Packet Stats, Availability, etc.). There is also a configuration buffer as part of the switch object which stores the configuration information to be applied on the switch.

The HMS 208, 214 of the illustrated example of FIG. 2 is a stateless software agent responsible for managing individual hardware resources in a physical rack 202, 204. Examples of hardware elements that the HMS 208, 214 manages are servers and network switches in the physical rack 202, 204. In the illustrated example, the HMS 208, 214 is implemented using Java on Linux so that an OOB management portion of the HMS 208, 214 runs as a Java application on a white box management switch (e.g., the management switch 207, 213) in the physical rack 202, 204. However, any other programming language and any other OS may be used to implement the HMS 208, 214.

Figure 3:
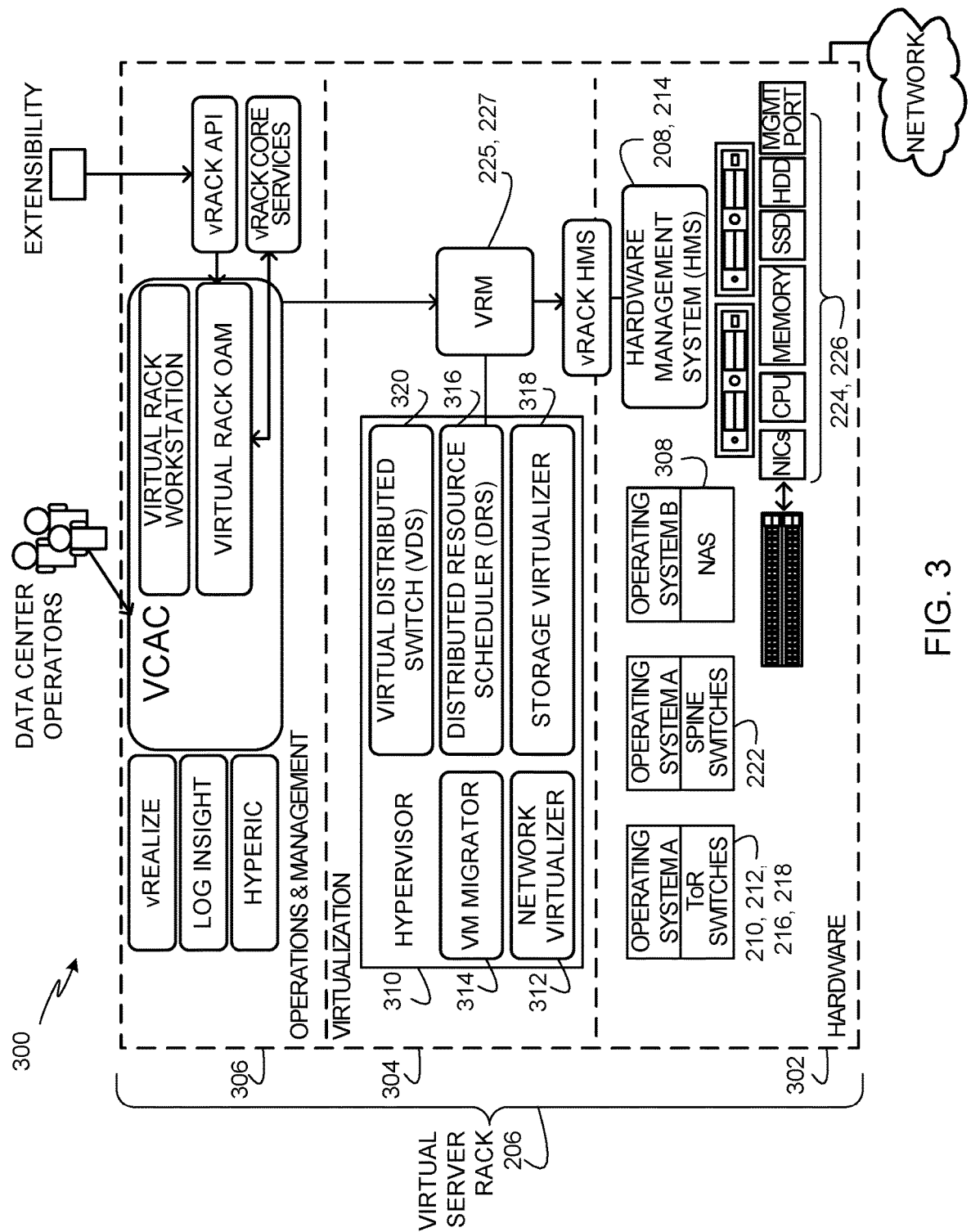
FIG. 3 depicts an example architecture to configure and deploy the example virtual server rack of FIG. 2.

FIG. 3 depicts an example virtual server rack architecture 300 that may be used to configure and deploy the virtual server rack 206 of FIG. 2. The example architecture 300 of FIG. 3 includes a hardware layer 302, a virtualization layer 304, and an operations and management layer (OAM) 306. In the illustrated example, the hardware layer 302, the virtualization layer 304, and the OAM layer 306 are part of the example virtual server rack 206 of FIG. 2. The virtual server rack 206 of the illustrated example is based on the physical racks 202, 204 of FIG. 2. The example virtual server rack 206 configures the physical hardware resources 224, 226, virtualizes the physical hardware resources 224, 226 into virtual resources, provisions virtual resources for use in providing cloud-based services, and maintains the physical hardware resources 224, 226 and the virtual resources.

The example hardware layer 302 of FIG. 3 includes the HMS 208, 214 of FIG. 2 that interfaces with the physical hardware resources 224, 226 (e.g., processors, NICs, servers, switches, storage devices, peripherals, power supplies, etc.), the ToR switches 210, 212, 216 and 218 of FIG. 2, the spine switches 222 of FIG. 2, and network attached storage (NAS) hardware 308. The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 202, 204 including the dual-redundant management switches 207, 213 and dedicated management ports attached to the server host nodes(0) 209, 211 and the ToR switches 210, 212, 216 and 218. In the illustrated example, one instance of the HMS 208, 214 runs per physical rack 202, 204. For example, the HMS 208, 214 may run on the management switch 207, 213 and the server host node(0) 209, 211 installed in the example physical rack 202 of FIG. 2. In the illustrated example of FIG. 2 both of the HMSs 208, 214 are provided in corresponding management switches 207, 213 and the corresponding server host nodes(0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes(0) 209, 211 on which the other HMS 208, 214 executes. In some examples, to achieve seamless failover, two instances of an HMS 208, 214 run in a single physical rack 202, 204. In such examples, the physical rack 202, 204 is provided with two management switches, and each of the two management switches runs a separate instance of the HMS 208, 214. In such examples, the physical rack 202 of FIG. 2 runs two instances of the HMS 208 on two separate physical hardware management switches and two separate server host nodes(0), and the physical rack 204 of FIG. 2 runs two instances of the HMS 214 on two separate physical hardware management switches and two separate server host nodes(0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes(0) in the physical rack 202 (or the two instances of the HMS 214 on two separate management switches and two separate server host nodes(0) in the physical rack 204) are connected over a point-to-point, dedicated Ethernet link which carries heartbeats and memory state synchronization between the primary and secondary HMS instances.

The example virtualization layer 304 includes the VRM 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of physical hardware resources 224, 226. The example VRM 225, 227 interfaces with an example hypervisor 310 of the virtualization layer 304. The example hypervisor 310 is installed and runs on server hosts in the example physical resources 224, 226 to enable the server hosts to be partitioned into multiple logical servers to create VMs. In some examples, the hypervisor 310 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources In the illustrated example of FIG. 3, the hypervisor 310 is shown having a number of virtualization components executing thereon including an example network virtualizer 312, an example VM migrator 314, an example distributed resource scheduler (DRS) 316, and an example storage virtualizer 318, and an example virtual distributed switch (VDS) 320. In the illustrated example, the VRM 225, 227 communicates with these components to manage and present the logical view of underlying resources such as hosts and clusters. The example VRM 225, 227 also uses the logical view for orchestration and provisioning of workloads.

The example network virtualizer 312 virtualizes network resources such as physical hardware switches (e.g., the management switches 207, 213 of FIG. 2, the ToR switches 210, 212, 216 and 218, and/or the spine switches 222) to provide software-based virtual networks. The example network virtualizer 312 enables treating physical network resources (e.g., switches) as a pool of transport capacity. In some examples, the network virtualizer 312 also provides network and security services to VMs with a policy driven approach. The network virtualizer 312 includes a number of components to deploy and manage virtualized network resources across servers, switches, and clients. For example, the network virtualizer 312 includes a network virtualization manager that functions as a centralized management component of the network virtualizer 312 and runs as a virtual appliance on a server host. In some examples, the network virtualizer 312 may be implemented using a VMWARE NSX™ network virtualization platform that includes a number of components including a VMWARE NSX™ network virtualization manager.

The example VM migrator 314 is provided to move or migrate VMs between different hosts without losing state during such migrations. For example, the VM migrator 314 allows moving an entire running VM from one physical server to another with substantially little or no downtime. The migrating VM retains its network identity and connections, which results in a substantially seamless migration process. The example VM migrator 314 enables transferring the VM's active memory and precise execution state over a high-speed network, which allows the VM to switch from running on a source server host to running on a destination server host.

The example DRS 316 is provided to monitor resource utilization across resource pools, to manage resource allocations to different VMs, to deploy additional storage capacity to VM clusters with substantially little or no service disruptions, and to work with the VM migrator 314 to automatically migrate VMs during maintenance with substantially little or no service disruptions.

The example storage virtualizer 318 is software-defined storage for use in connection with virtualized environments. The example storage virtualizer 318 clusters server-attached hard disk drives (HDDs) and solid-state drives (SSDs) to create a shared datastore for use as virtual storage resources in virtual environments. In some examples, the storage virtualizer 318 may be implemented using a VMWARE® VIRTUAL SAN™ network data storage virtualization component developed and provided by VMware, Inc.

Figure 4:
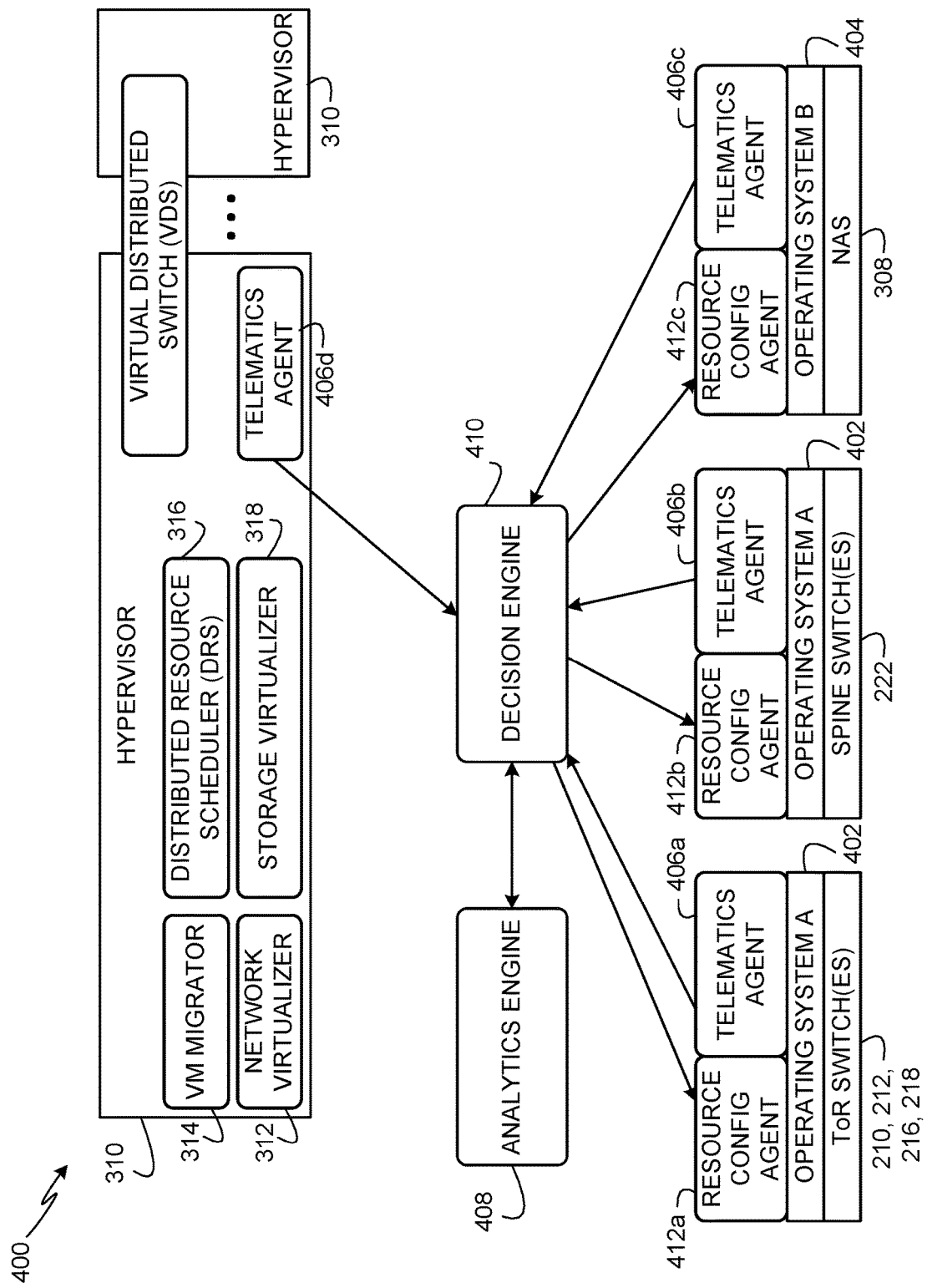
FIG. 4 depicts an example virtual cloud management system that may be used to implement examples disclosed herein.

The example VDS 320 implements software-defined networks for use in connection with virtualized environments in the form of a networking module for the hypervisor 310. In some examples, the VDS 320 is distributed across multiple hosts, where there is a separate instance of the hypervisor 310, as shown in FIG. 4.

The virtualization layer 304 of the illustrated example, and its associated components are configured to run VMs. However, in other examples, the virtualization layer 304 may additionally, and/or alternatively, be configured to run containers. For example, the virtualization layer 304 may be used to deploy a VM as a data computer node with its own guest OS on a host using resources of the host. Additionally, and/or alternatively, the virtualization layer 304 may be used to deploy a container as a data computer node that runs on top of a host OS without the need for a hypervisor or separate OS.

In the illustrated example, the OAM layer 306 is an extension of a VMWARE VCLOUD® AUTOMATION CENTER™ (VCAC) that relies on the VCAC functionality and also leverages utilities such as VMWARE VCENTER™ Log Insight™, and VMWARE VCENTER™ HYPERIC® to deliver a single point of SDDC operations and management. The example OAM layer 306 is configured to provide different services such as health monitoring service, capacity planner service, maintenance planner service, events and operational view service, and virtual rack application workloads manager service.

Example components of FIG. 3 may be implemented using products developed and provided by VMware, Inc. Alternatively, some or all of such components may alternatively be supplied by components with the same and/or similar features developed and/or provided by other virtualization component developers.

FIG. 4 depicts an example virtual cloud management system 400 that may be used to implement examples disclosed herein. The example virtual cloud management system 400 includes the example network virtualizer 312, the example VM migrator 314, the example DRS 316, the example storage virtualizer 318, and the example VDS 320 of FIG. 3.

In the illustrated example of FIG. 4, the virtual cloud management system 400 is implemented using a SDDC deployment and management platform such as the VMware Cloud Foundation (VCF) platform developed and provided by VMware, Inc. The example virtual cloud management system 400 manages different parameters of the ToR switches 210, 212, 216 and 218, the spine switches 222, and the NAS 308. The example virtual cloud management system 400 commands different components even when such components run different OSs. For example, the ToR switches 210, 212, 216 and 218 and the spine switches 222 run OS A 402, and the NAS 308 runs OS B 404. In the illustrated example, the OS A 402 and the OS B 404 are different types of OSs. For example, the OS A 402 and the OS B 404 may be developed by different companies, may be developed for different hardware, may be developed for different functionality, may include different kernels, and/or may be different in other ways. In some examples, the OS A 402 may be implemented using a Cisco NX-OS (developed and provided by Cisco Systems, Inc.) that can be run on leaf switches and/or spine switches, and the OS B 404 may be implemented using an EMC NAS OS (developed and provided by EMC Corporation) that runs on network attached storage devices. In the illustrated example of FIG. 4, OS A 402 and OS B 404 are unaware of the events occurring in the hypervisor 310. However, examples disclosed herein enable monitoring different OSs across physical resources at a system level to provide cooperative inter-OS and inter-resource management.

The example virtual cloud management system 400 includes example telematics agents 406a-d, an example analytics engine 408, an example decision engine 410, and example resource configuration agents 412a, 412b and 412c. In some examples, the information collector 104 of FIG. 1 is implemented using any of the example telematics agents 406a-d, and the example hardware (HW) resource configuration agents 101 of FIG. 1 is implemented using the example resource configuration agents 412a-c. In the illustrated example, the telematics agents 406a-d are provided to collect information from different hardware resources (including the ToR switches 210, 212, 216 and 218, and/or the spine switches 222), and provide the information to the example decision engine 410. In the illustrated example, the telematics agents 406a-d are provided as add-on modules installable and executable on the different components. For example, the telematics agent 406a is installed and executed on the OS A 402 of the ToR switches 210, 212, 216 and 218, the example telematics agent 406b is installed and executed on the OS A 402 of the spine switches 222, the example telematics agent 406c is installed and executed on the OS B 404 of the NAS 308, and the example telematics agent 406d is installed and executed on the hypervisor 310. In the illustrated example, the telematics agents 406a-d run on respective components while creating substantially little or no interference to the OSs of those components. For example, the telematics agents 406a-d may be implemented as a set of Access Control List (ACL) rules that operate as data collection rules to capture signatures of events occurring in the virtual cloud management system 400. Such data collection rules can include static rules and/or dynamic rules. Example data collection rules can be used to collect statistics for various packet flows, to detect starts of VM migrations, to detect starts of virtualized storage rebalancing, to collect virtual extensible local area network (VXLAN) flow statistics, to collect L2 hop counts between various media access control (MAC) addresses, to collect QoS statistics, to collect MTU configurations, to collect ECMP routing hash policies, to collect routing changes, etc. The example telematics engines 406a-d collect such information periodically and send the telematics-collected information to the example decision engine 410 for analysis by the example analytics engine 408 and to identify subsequent responsive action based on such telematics-collected information.

The example decision engine 410 runs on a VM and is provided to make decisions based on analyses of the telematics-collected information received from the telematics agents 406a-d. For example, the decision engine 410 can program the resource configuration agents 412a-c based on analyses of the telematics-collected information performed by the analytics engine 408. In some examples, the example analytics engine 408 is used to implement the example packet analyzer 110 (of FIG. 1), and the decision engine 410 is used to implement the example issue handler manager 114 (of FIG. 1). In some examples, the telematics-collected information is low-level primitive data, and the decision engine 410 is configured to identify high-level events based on such low-level primitive data. For example, if the telematics-collected information includes low-level primitive data indicative of statistics for various packet flows, the decision engine 410 may identify a high-level event such as a network misconfiguration or an under-provisioning of network resources based on too many dropped packets for certain packet flows. In another example, if the telematics-collected information includes low-level primitive data that reflects the start of a VM migration, the decision engine 410 identifies an imminent need for a large amount of network bandwidth to perform such VM migration. In yet another example, if the telematics-collected information includes low-level primitive data that reflects the start of virtualized storage rebalancing, the decision engine 410 identifies an imminent burst of virtualized storage traffic based on the possibility that a disk is either being added or deleted. In yet another example, if the telematics-collected information includes low-level primitive data that reflects VXLAN flow statistics, the decision engine 410 identifies use of large amounts of network bandwidth based on VM network usage reflected in the VXLAN flow statistics. In yet another example, if the telematics-collected information includes low-level primitive data that reflects L2 hop counts between various MAC addresses, the decision engine 410 identifies an opportunity to migrate VMs closer to one another (e.g., migrate VMs to server hosts that are in the same physical rack or on neighboring physical racks) based on collected L2 hop count information in combination with VXLAN flow statistics.

The example analytics engine 408 runs on a VM and is provided to analyze the telematics-collected information received from the telematics agents 406a-d. For example, the analytics engine 408 can perform big data analyses by periodically accessing the telematics-collected information and analyzing the information, for example, for any system misconfigurations and/or inconsistencies. Some example types of analyses include analyzing information collected using packet sniffers in physical switches to: detect elephant flows and optimize network resources to handle such elephant flows, identify security issues, identify out-of-order delivery of packets, identify network bottlenecks, identify MTU misconfigurations, etc. Another example type of analysis includes analyzing syslog (system log) messages to identify critical system issues.

The example resource configuration agents 412a-c provide hardware agnostic APIs, which can be accessed by the decision engine 410 to change hardware configurations of corresponding hardware resources (e.g., the ToR switches 210, 212, 216 and 218; the spine switches 222; the NAS 308, etc.). In this manner, the example decision engine 410 can improve operating and/or communication performances and/or efficiencies of the virtual server rack 206 (FIG. 2) by programming configurations of hardware resources via the resource configuration agents 412a-c in response to different events detected based on the analyses of the telematics-collected information performed by the analytics engine 408.

Figure 5:
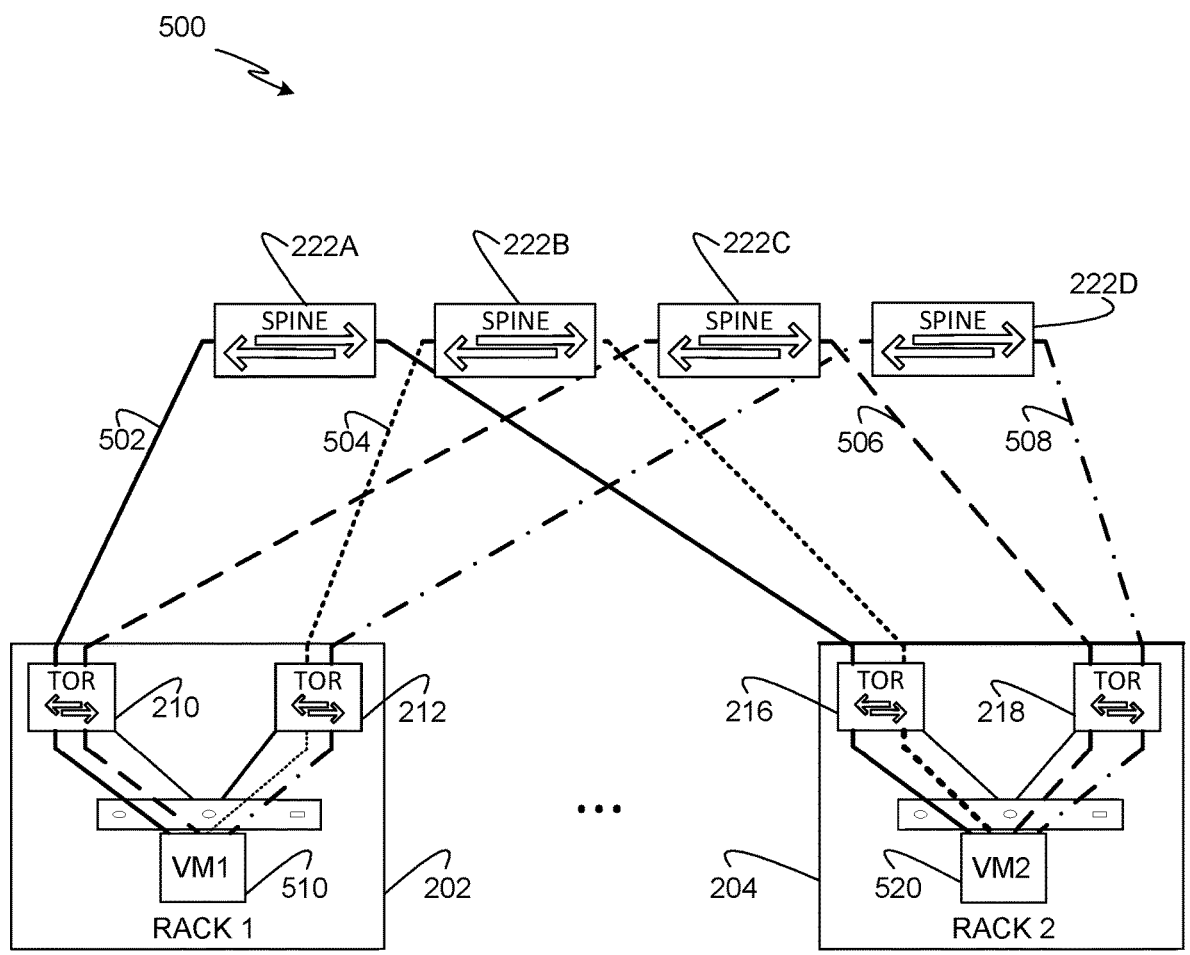
FIG. 5 depicts an example communication network implemented using the example architecture of FIG. 3.

FIG. 5 depicts example first, second, third, and fourth communication paths 502, 504, 506 and 508 between an example first VM 510 of the example first physical rack 202 and an example second VM 520 of the example second physical rack 204. In the illustrated example of FIG. 5, the first VM 510 is coupled to a set of first, second, third and fourth spine switches 222A-222D via example first and second ToR switches 210, 212. The second VM 520 is coupled to the first, second, third and fourth spine switches 222 and 222A-222D via example third and fourth ToR switches 216, 218.

The example first communication path 502 travels from the first VM 510 through the first ToR switch 210 of the first physical rack 202 to the first spine switch 222A, then to the third ToR switch 216 of the second physical rack 204, and finally, to the second VM 520. The example second communication path 504 travels from the first VM 510 through the second ToR switch 212 of the first physical rack 202, to the second spine switch 222B, and then to the first ToR switch 216 and, finally to the second VM 520 of the second physical rack 204. The third communication path 506 travels from the first VM 510 through the first ToR switch 210 of the first physical rack 202 to the third spine switch 222C, then to the fourth ToR switch 218 of the second physical rack 204, and, finally, to the second VM 520. The fourth communication path 508 travels from the first VM 510 through the second ToR switch 212 of the first physical rack 202, to the fourth spine switch 222D, and then to the fourth ToR switch 218 of the second rack 204, and, finally to the second VM 520.

In some examples, switch configuration errors and traffic congestion can negatively impact the network transport efficiency of the first, second, third and fourth communication paths 502, 504, 506 and 508. For example, the spine switches 222A-222D, and/or the ToR switches 210, 212, 216 and 218 are subject to an MTU that identifies the size of the largest network layer protocol data unit that can be communicated in a single network transaction. In some examples, one or more packet(s) of a network transaction are dropped (or will be dropped) by the spine switches 222 and 222A-222D, and/or the ToR switches 210, 212, 216 and 218, when the network transaction size exceeds the MTU of one or more of the spine switches 222 and 222A-222D, and/or the ToR switches 210, 212, 216 and 218, of a communication path carrying the network transaction. In some examples, one or more of the spine switches 222 and 222A-222D, and/or the ToR switches 210, 212, 216 and 218, attempt to fragment a network transaction into multiple pieces, each piece having a size that satisfies the MTU. However, the network transaction may include a "don't fragment" indicator that indicates that the network transaction cannot be fragmented. In some such examples, one or more of the spine switches 222 and 222A-222D, and/or the ToR switches 210, 212, 216 and 218, must drop the packet and send an Internet Control Message Protocol (ICMP) fragmentation error message to the source of the packet. In some examples, one or more of the spine switches 222 and 222A-222D, and/or the ToR switches 210, 212, 216 and 218, receives an ICMP fragmentation error indicating that a previous packet transmission was unsuccessful.

In some examples, the example MTU issue identifier 136 (FIG. 1) of the example packet analyzer 110 (FIG. 1) analyzes packets received from the spine switches 222 and 222A-222D, and/or the ToR switches 210, 212, 216 and 218 (shown as the switches 106A-C in FIG. 1) to determine whether any of the packets indicate an MTU error has occurred (e.g., a packet was dropped due to an MTU error). When any of the packets indicate that an MTU error has occurred, the example MTU drop handler 146 (FIG. 1) takes one or more corrective actions to ensure that all the switches are subject to a same MTU value.

Another configuration issue that can also negatively impact the network transport efficiency of the first, second, third and fourth communication paths 502, 504, 506 and 508 involves the usage of ECMP routing strategies. For example, the spine switches 222 and 222A-222D, and/or the ToR switches 210, 212, 216 and 218 can be configured to transmit information using an ECMP algorithm. In some such examples, the packets of a multiple packet communication can be transmitted via different communication paths provided that the different paths are determined to be of equal cost (e.g., have a tie) when a routing metric calculation (e.g., a hash algorithm) is applied. Packets transmitted on communication paths having equal costs will travel at the same speed so packets transmitted from a source to a destination will arrive at the destination in order even though some of the packets of the communication are transmitted via different communication paths. Thus, some packets of a communication message initiated at VM1 of FIG. 5 and destined for VM2 of FIG. 5 may travel via any of the first communication path 502, the second communication path 504, the third communication path 506, and the fourth communication path 508, provided that all of the first, second, third and fourth communication paths 502, 504, 506 and 508 have equal costs. In some such examples, the packets should arrive at the second VM 520 in the order in which they were transmitted by the first VM 510 regardless of the communication path used to send the packets. However, in some examples, a hash algorithm used to determine the cost of the first, second, third and fourth communications paths 502, 504, 506 and 508 may incorrectly determine two or more of the communication paths to have an equal cost such that packets of a network communication transmitted on the first communication path 502 arrive out of order relative to packets of the network communication transmitted on the second communication path 504. In some such examples, the hash algorithm used to calculate the cost of each of the first, second, third and fourth communication paths 502, 504, 506 and 508, may need to be adjusted.

In some examples, the example ECMP issue identifier 138 of the example packet analyzer 110 analyzes packets received from the spine switches 222 and 222A-222D, and/or the ToR switches 210, 212, 216 and 218 (shown as the switches 106A-C in FIG. 1) to determine whether any of the packets indicate an ECMP issue has occurred (e.g., packets were received out of order at a destination). When any of the packets indicate that an ECMP issue has occurred, the example ECMP issue handler 148 takes one or more corrective actions (e.g., adjust an ECMP hash algorithm associated with one or more links of the first, second, third and fourth communication paths 502, 504, 506 and 508.

Improperly populated routing tables can also negatively impact the network transport efficiency of the first, second, third and fourth communication paths 502, 504, 506 and 508. For example, the spine switches 222 and 222A-222D, and/or the ToR switches 210, 212, 216 and 218, can be configured to use border gateway protocol (BGP) and/or OSPF (or any other) routing strategies. In some such examples, the spine switches 222 and 222A-222D, and/or the ToR switches, include routing tables in which routing information is stored. The spine switches 222 and 222A-222D, and/or the ToR switches 210, 212, 216 and 218, use the routing tables to determine a final destination or a next hop destination to which the packet(s) is to be routed. If the information in the routing tables is not accurate, one or more packets will be inefficiently routed, and/or dropped.

In some examples, the example route failure identifier 140 of the example packet analyzer 110 of FIG. 1 analyzes packets received from the spine switches 222 and 222A-222D, and/or the ToR switches 210, 212, 216 and 218 (shown as the switches 106A-C in FIG. 1) to determine whether any of the packets were dropped due to a route failure. When any of the packets indicate that a routing failure occurred, the example route failure handler 150 (FIG. 1) takes one or more corrective actions (e.g., revising one or more routing tables of the spine switches 222 and 222A-222D, and/or the ToR switches 210, 212, 216 and 218.

Congestion caused by an attack can also negatively impact the network transport efficiency of the first, second, third and fourth communication paths 502, 504, 506 and 508. A DDoS attack occurs when, for example, a malicious actor outside of the virtual environment floods a network resource with illegitimate requests in an attempt to block legitimate requests from reaching the network resource. For example, a DDoS attack on the first VM 510 may severely congest any or all of the first, second, third and fourth communication paths 502, 504, 506 and 508, thereby negatively impacting the efficiency of the communication network.

In some examples, the example DDoS attack identifier 142 of the example packet analyzer 110 of FIG. 1 analyzes packets received from the spine switches 222 and 222A-222D, and/or the ToR switches 210, 212, 216 and 218 (shown as the switches 106A-C in FIG. 1) to determine whether any of the packets indicate a DDoS attack is, or is likely underway. When a DDoS attack is, or is likely underway, the example DDoS attack handler 152 (FIG. 1) takes one or more corrective actions (e.g., prevents further packets from an IP address associated with the source of the DDoS from being transmitted).

A QoS mismatch between the example spine switches 222 and 222A-222D, the example ToR switches 210, 212, 216 and 218, and one or more VDSs 320 (see FIGS. 3 and 4) in the virtual environment can also negatively impact the example first, second, third and fourth communication paths 502, 504, 506 and 508 by causing one or more packets that do not meet a QoS criteria to be dropped.

In some examples, the example QoS buffer drop identifier 144 (FIG. 1) of the example packet analyzer 110 of FIG. 1 analyzes packets received from the spine switches 222 and 222A-222D, and/or the ToR switches 210, 212, 216 and 218 (shown as the switches 106A-C in FIG. 1) to determine whether any of the packets indicate that a QoS mismatch exists, or is likely to exist. When a QoS mismatch or a likely QoS mismatch is detected, the example QoS buffer drop handler 154 (FIG. 1) takes one or more corrective actions (e.g., identifies mismatched QoS criteria and revises the criteria as needed).

While an example manner of implementing the example hardware resource configuration system 100 is illustrated in FIG. 1, one or more of the elements, processes and/or devices illustrated in FIG. 1 may be combined, divided, re-arranged, omitted, eliminated and/or implemented in any other way. Further, the example input device 126, the example information collector manager 102, the example information collector configurer 124, the example information collector 104, the example ECMP error message collector 128, the example packet collector 130, the example dropped packet collector 132, the example packet analyzer 110, the example issue identifier 112, the example packet grabber 134, the example MTU issue identifier 136, the example ECMP issue identifier 138, the example route failure identifier 140, the example DDoS attack identifier 142, the example QoS buffer drop identifier 144, the example issue handler manager 114, the example MTU drop handler 146, the example ECMP issue handler 148, the example route failure handler 150, the example DDoS attack handler 152, the example QoS buffer drop handler 154 of FIG. 1, the example telematics agents 406a-c, the example analytics engine 408, and the example decision engine 410 of FIG. 4 and/or, more generally, the example hardware resource configuration system 100 of FIG. 1 may be implemented by hardware, software, firmware and/or any combination of hardware, software and/or firmware. Thus, for example, any of the example input device 126, the example information collector manager 102, the example information collector configurer 124, the example information collector 104, the example ECMP error message collector 128, the example packet collector 130, the example dropped packet collector 132, the example packet analyzer 110, the example issue identifier 112, the example packet grabber 134, the example MTU issue identifier 136, the example ECMP issue identifier 138, the example route failure identifier 140, the example DDoS attack identifier 142, the example QoS buffer drop identifier 144, the example issue handler manager 114, the example MTU drop handler 146, the example ECMP issue handler 148, the example route failure handler 150, the example DDoS attack handler 152, the example QoS buffer drop handler 154 of FIG. 1, the example telematics agents 406a-c, the example analytics engine 408, and the example decision engine 410 of FIG. 4 and/or, more generally, the example hardware resource configuration system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input device 126, the example information collector manager 102, the example information collector configurer 124, the example information collector 104, the example ECMP error message collector 128, the example packet collector 130, the example dropped packet collector 132, the example packet analyzer 110, the example issue identifier 112, the example packet grabber 134, the example MTU issue identifier 136, the example ECMP issue identifier 138, the example route failure identifier 140, the example DDoS attack identifier 142, the example QoS buffer drop identifier 144, the example issue handler manager 114, the example MTU drop handler 146, the example ECMP issue handler 148, the example route failure handler 150, the example DDoS attack handler 152, the example QoS buffer drop handler 154 of FIG. 1, the example telematics agents 406a-c, the example analytics engine 408, and the example decision engine 410 of FIG. 4 and/or, more generally, the example hardware resource configuration system 100 of FIG. 1 is/are hereby expressly defined to include a non-transitory computer readable storage device or storage disk such as a memory, a digital versatile disk (DVD), a compact disc (CD), a Blu-ray disk, etc. including the software and/or firmware. Further still, the example input device 126, the example information collector manager 102, the example information collector configurer 124, the example information collector 104, the example ECMP error message collector 128, the example packet collector 130, the example dropped packet collector 132, the example packet analyzer 110, the example issue identifier 112, the example packet grabber 134, the example MTU issue identifier 136, the example ECMP issue identifier 138, the example route failure identifier 140, the example DDoS attack identifier 142, the example QoS buffer drop identifier 144, the example issue handler manager 114, the example MTU drop handler 146, the example ECMP issue handler 148, the example route failure handler 150, the example DDoS attack handler 152, the example QoS buffer drop handler 154 of FIG. 1, the example telematics agents 406a-c, the example analytics engine 408, and the example decision engine 410 of FIG. 4 and/or, more generally, the example hardware resource configuration system 100 of FIG. 1 may include one or more elements, processes and/or devices in addition to, or instead of, those illustrated in FIG. 1 and FIG. 4, and/or may include more than one of any or all of the illustrated elements, processes and devices.

Flowcharts representative of example machine readable instructions for implementing the example hardware resource configuration system 100 of FIG. 1, and the example telematics agents 406a-c, the example analytics engine 408, the example decision engine 410, and the example resource configuration agents 412a-412c of FIG. 4 are shown in FIGS. 6-12. In these examples, the machine-readable instructions implement one or more programs for execution by one or more processors such as an example processor 1312 shown in the example processor platform 1300 discussed below in connection with FIG. 13. The program(s) may be embodied in software stored on a non-transitory computer readable storage medium such as a CD, a floppy disk, a hard drive, a DVD, a Blu-ray disk, or a memory associated with the processor 1312, but the entirety of the program(s) and/or parts thereof could alternatively be executed by a device other than the processor 1312 and/or embodied in firmware or dedicated hardware. Further, although the example program(s) is described with reference to the flowcharts illustrated in FIGS. 6-12, many other methods of implementing the example hardware resource configuration system 100, the example telematics agents 406a-c, the example analytics engine 408, the example decision engine 410 and the example resource configuration agents 412a-412c may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, a field-programmable gate array (FPGA), an ASIC, a comparator, an operational-amplifier (op-amp), a logic circuit, etc.) structured to perform the corresponding operation(s) without executing software or firmware.

As mentioned above, the example processes of FIGS. 6-12 may be implemented using coded instructions (e.g., computer and/or machine readable instructions) stored on a non-transitory computer and/or machine readable medium such as a hard disk drive, a flash memory, a read-only memory, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 6:
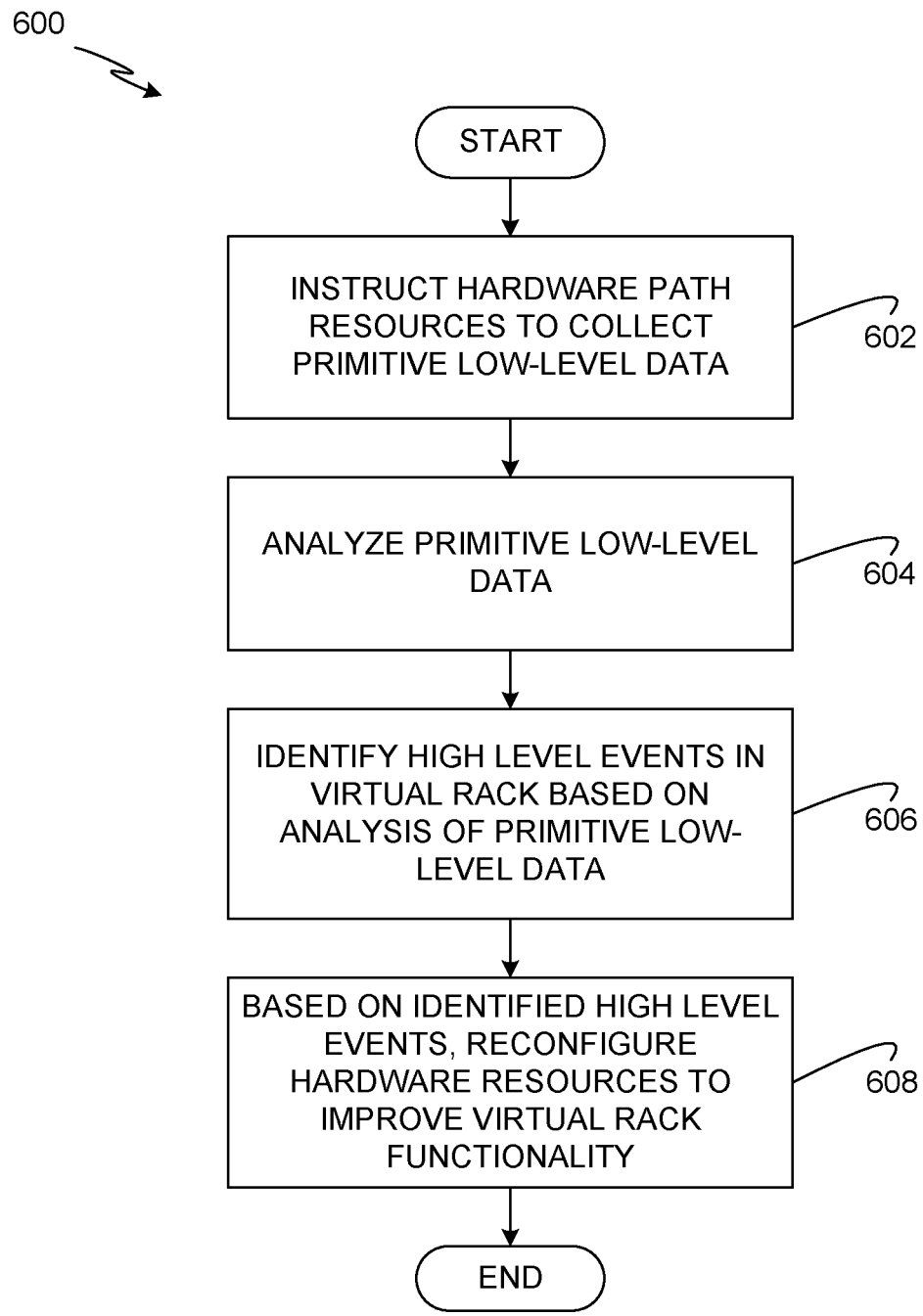
FIG. 6 is a flow chart representative of example machine readable instructions that may be executed to implement the example hardware configuration system of FIG. 1.

FIG. 6 is a flowchart representative of an example method 600 that may be performed by the example hardware resource configuration system 100 of FIG. 1 and the example telematics agents 406a-c, the example analytics engine 408, the example resource configuration agents 412a-412c and the example decision engine 410 of FIGS. 1 and 4 to improve packet flow among virtualized servers. The example method 600 begins at block 602 when the example information collector manager 102 (see FIG. 1) instructs the example information collector 104 (see FIG. 1) to collect primitive low-level data (block 602). Example primitive low-level data includes, but is not limited to, an MTU being exceeded, an ECMP error, a route failure, a DDoS attack, packets dropped from a QoS buffer, etc. The example packet analyzer 110 (see FIG. 1) analyzes the primitive low-level data (block 604). The example packet analyzer 110 identifies high-level events that are occurring (or need to occur) in the virtual rack based on the analysis of the primitive low-level data (block 606). Based on the identified high-level events, the example issue handler manager 114 causes the example HW resource configuration agents 101 (see FIG. 1) to perform one or more operations to compensate for the high-level events. Thereafter, the example method 600 may end or may repeat indefinitely to continue tuning the virtual communication network 500 of FIG. 5.

Figure 7:
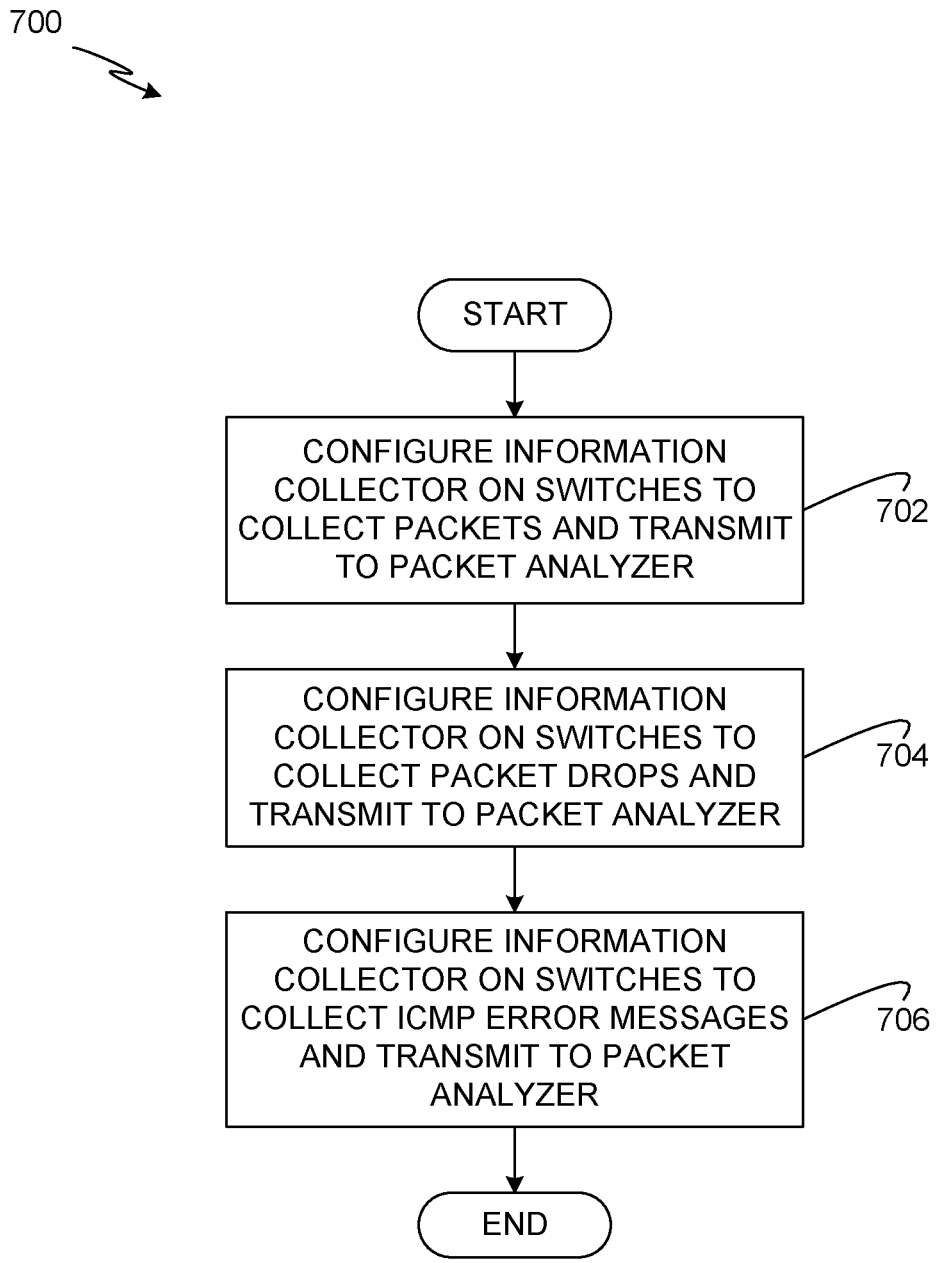
FIG. 7 is a flow chart representative of example machine readable instructions that may be executed to cause primitive low-level data to be collected at a switch.

FIG. 7 is a flowchart representative of an example method 700 that may be performed by the example hardware resource configuration system 100 of FIG. 1 to cause primitive low-level data to be collected at a switch (e.g., any of the example switches 106A-C, ToR switches 210, 212, 216 and 218, and/or spline switches 222 and 222A-D. The example method 700 begins at block 702 when the example information collector configurer 124 (see FIG. 1) configures the example information collector 104 (see FIG. 1) to collect any, all or some of the packets flowing through the corresponding example switch 106A (see FIG. 1) and to transmit the collected packets to the example packet analyzer 110 (block 702). The example information collector configurer 124 also configures the example information collector 104 to collect dropped packets and to transmit the dropped packets to the example packet analyzer 110 (block 704). The example information collector configurer 124 further configures the example information collector 104 to collect ICMP error messages and to transmit the ICMP error messages to the example packet analyzer 110 (block 706). Thereafter, the example method 700 ends.

Figure 8:
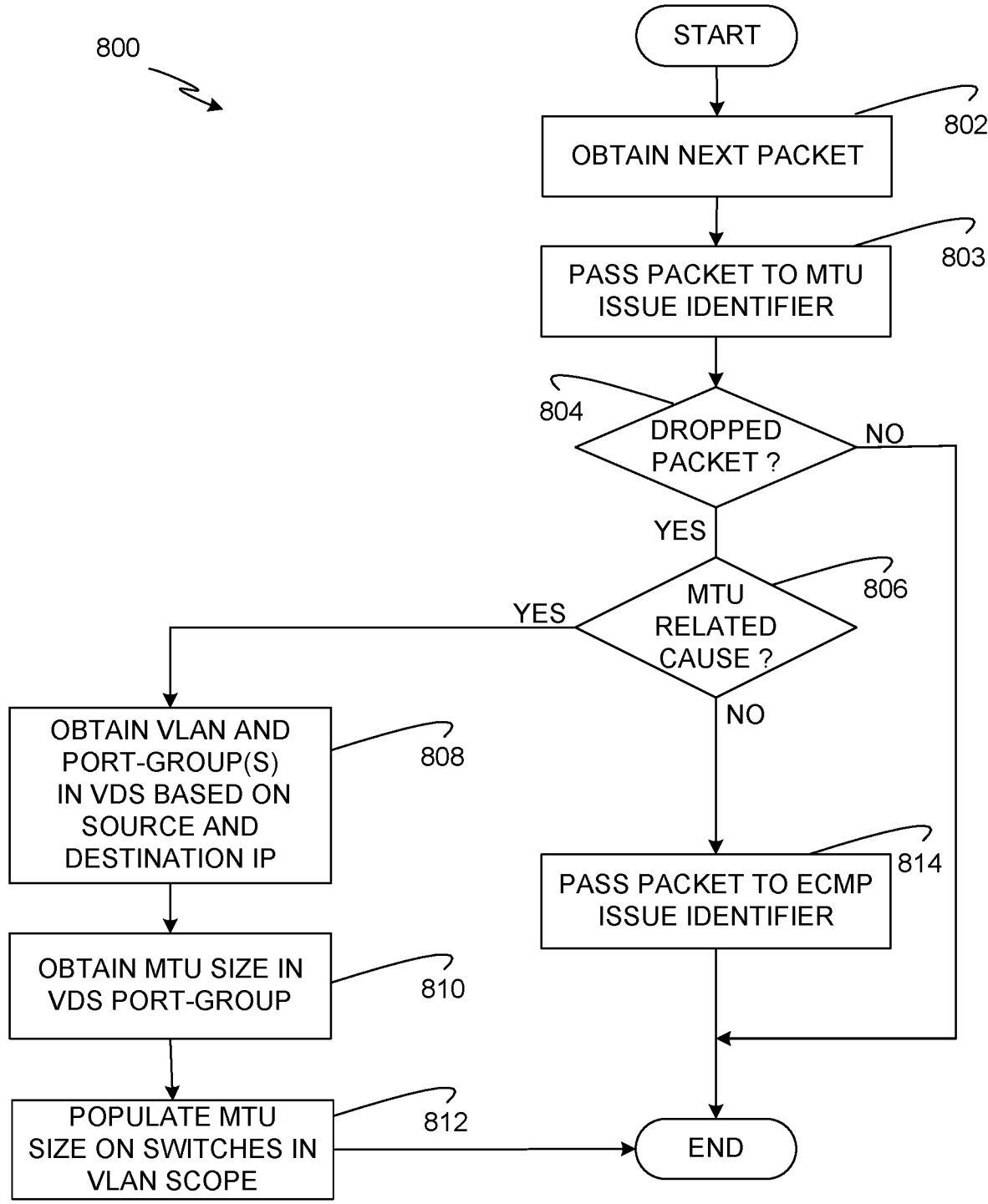
FIG. 8 is a flow chart representative of example machine readable instructions that may be executed to implement the example hardware configuration system of FIG. 1.

FIG. 8 is a flowchart representative of an example method 800 that may be performed by the example hardware resource configuration system 100 of FIG. 1 to detect MTU issue(s) in the virtual communication network 500 of FIG. 5. The example method 800 begins at block 802 when the example packet grabber 134 (see FIG. 1) obtains (e.g., gets, grabs, receives, accesses, etc.) a next packet from the example information collector 104. The example packet grabber 134 determines whether the packet was dropped (block 804). If the packet was dropped, the packet grabber 135 supplies the packet to the example MTU issue identifier 136 (see FIG. 1). The example MTU issue identifier 136 determines whether the packet is a dropped packet due to an MTU related cause (block 806). For example, the example MTU issue identifier 136 determines whether the packet size is greater than a configured MTU size, whether the packet was dropped due to an ICMP fragmentation error packet, etc. In some examples, the MTU issue identifier 136 sends the dropped packet or information related to the packet (e.g., source address, destination address, and packet size) to a server to analyze the cause of the packet being dropped. If the example MTU issue identifier 136 determines that the packet is a dropped packet due to an MTU related cause (block 806), the dropped packet is supplied to the example MTU drop handler 146 (see FIG. 1). The example MTU drop handler 146 obtains associated virtual local area network (VLAN) and Port-Group identifiers for a VDS (e.g., the example VDS 320 of FIGS. 3 and 4) of a virtual rack (e.g., the example virtual rack 206 of FIG. 2) based on a source IP address and a destination IP address included in the packet (block 808). In some examples, the switch 106A is a physical hardware switch (e.g., one of the example spine switches 222 and 222A-222D, and/or one of the example ToR switches 210, 212, 216 and 218) onto which the VDS 320 is abstracted. In some such examples, the example MTU drop handler 146 obtains the VLAN and Port-Group identifiers from the example telematics agent 406d (see FIG. 4) of the example hypervisor 310 of FIG. 4. In addition, the example MTU drop handler 146 obtains the MTU size assigned to the VDS Port-Group (block 810). The MTU drop handler 146 configures the switches of the virtual rack (e.g., of the spine switches 222 or 222A-222D, and/or the ToR switches 210, 212, 216 and 218) with that MTU (block 812), and the method 800 ends. In the illustrated example, changing the MTU size used by the spine switches 222 and 222A-222D, and/or the ToR switches 210, 212, 216 and 218 to that used by the VDS 320 obviates current MTU drop issues from occurring on the virtual rack.

Returning to block 806, if the example MTU issue identifier 136 determines that the packet is not a dropped packet due to an MTU related cause (block 806), the MTU issue identifier 136 passes the dropped packet to the ECMP issue identifier 138 (see FIG. 1) (block 814), and the method 800 ends.

Figure 9:
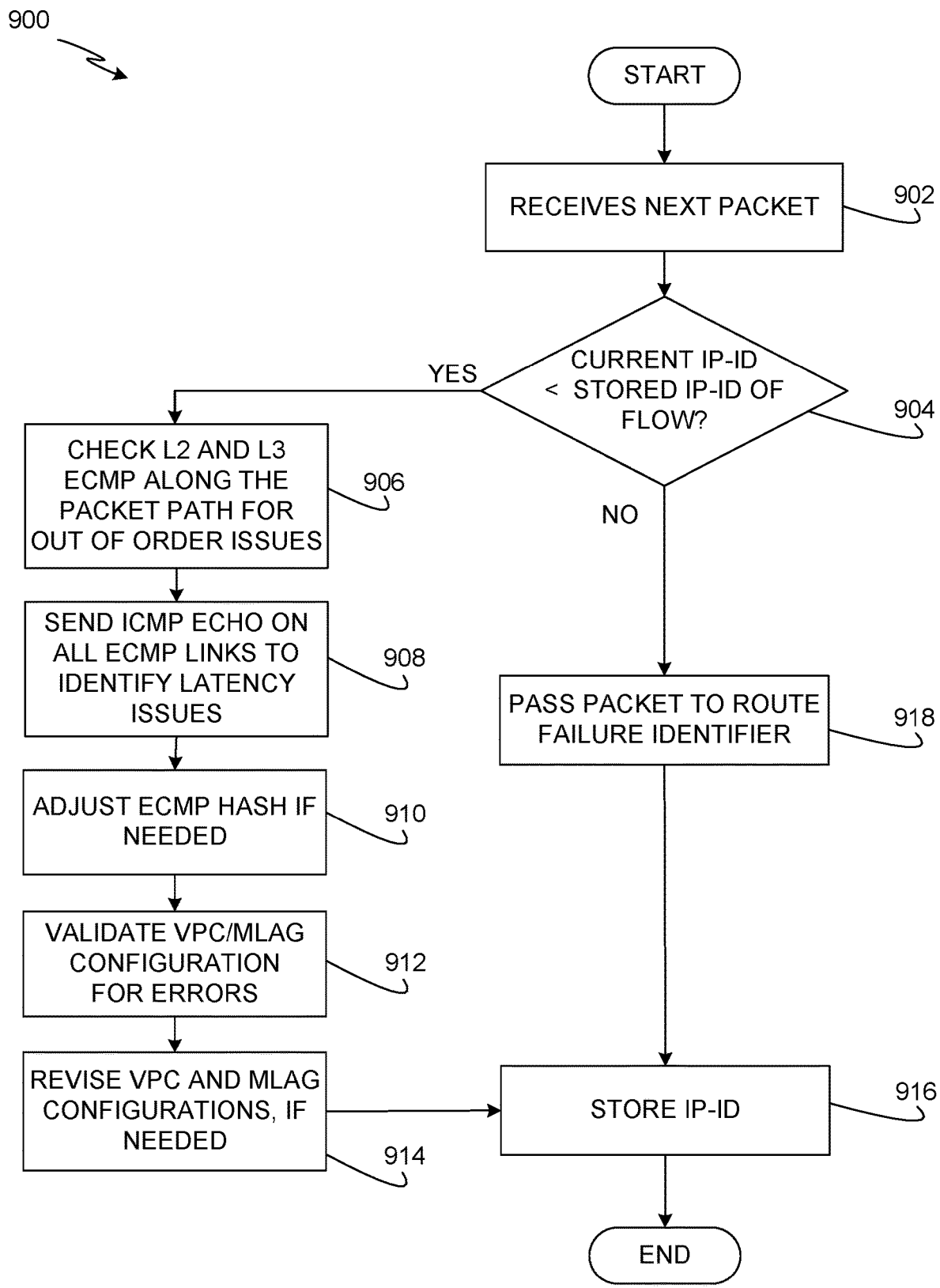
FIG. 9 is a flow chart representative of example machine readable instructions that may be executed to implement the example hardware configuration system of FIG. 1.

FIG. 9 is a flowchart representative of an example method 900 that may be performed by the example hardware resource configuration system 100 of FIG. 1 to detect ECMP issues in the virtual communication network 500 of FIG. 5. The example method 900 begins at block 902 at which the example ECMP issue identifier 136 (see FIG. 1) obtains a next packet. The example ECPM issue identifier 136 receives the packet from the example MTU issue identifier 136. In some examples, packets associated with a same flow have the same srcIP, destIP, srcPort, destPort, and protocol fields. The example ECMP issue identifier 138 also determines whether the current IP-ID is less than a previously stored IP-ID of the same flow (e.g., the current flow) (block 904). If so, then a packet has been received out of order, and the example ECMP issue identifier 138 passes the packet to the example ICMP issue handler 148 (see FIG. 1) which checks a set of L2 and L3 ECMP values along the packet path for "out of order" issues (block 906). In some examples, the ECMP issue handler 138 identifies a non-symmetric VPC configuration, traces the paths between the source and destination to identify whether some routes are of different lengths, etc. In some examples, the example ECMP issue handler 148 checks the L2 and L3 ECMP values by accessing information obtained by the example telematics agent 406d of the example hypervisor 310 (see FIG. 4). In addition, the example ECMP issue handler 148 sends an ICMP echo on all communication path ECMP links to identify latency issues (block 908). If needed, the ECMP issue handler 148 adjusts the ECMP hash value associated with one more of the communication path ECMP links (block 910). In some examples, the example ECMP issue handler 148 (see FIG. 1) causes the HW resource configuration agent 101 to adjust the ECMP values of the communication path links. The ECMP issue handler 148 further validates the virtual private cloud (VPC)/multi-chassis link aggregation (MLAG) configuration for errors (block 912). The ECMP issue handler 148 causes the example HW resource configuration agent 101 (see FIG. 1) to revise the VPC and MLAG configurations, if needed (block 914). The example ECMP issue identifier 138 stores the IP-ID of the current packet (block 916), and the method 900 ends.

Returning to block 904, if the example ECMP issue identifier 138 determines that the packet being examined is not out of order (block 904), the example ECMP issue identifier 138 passes the packet to the example example route failure identifier 140 (see FIG. 1) (block 918). The example ECMP issue identifier 138 stores the IP-ID of the current packet (block 912), and the method 900 ends.

Figure 10A:
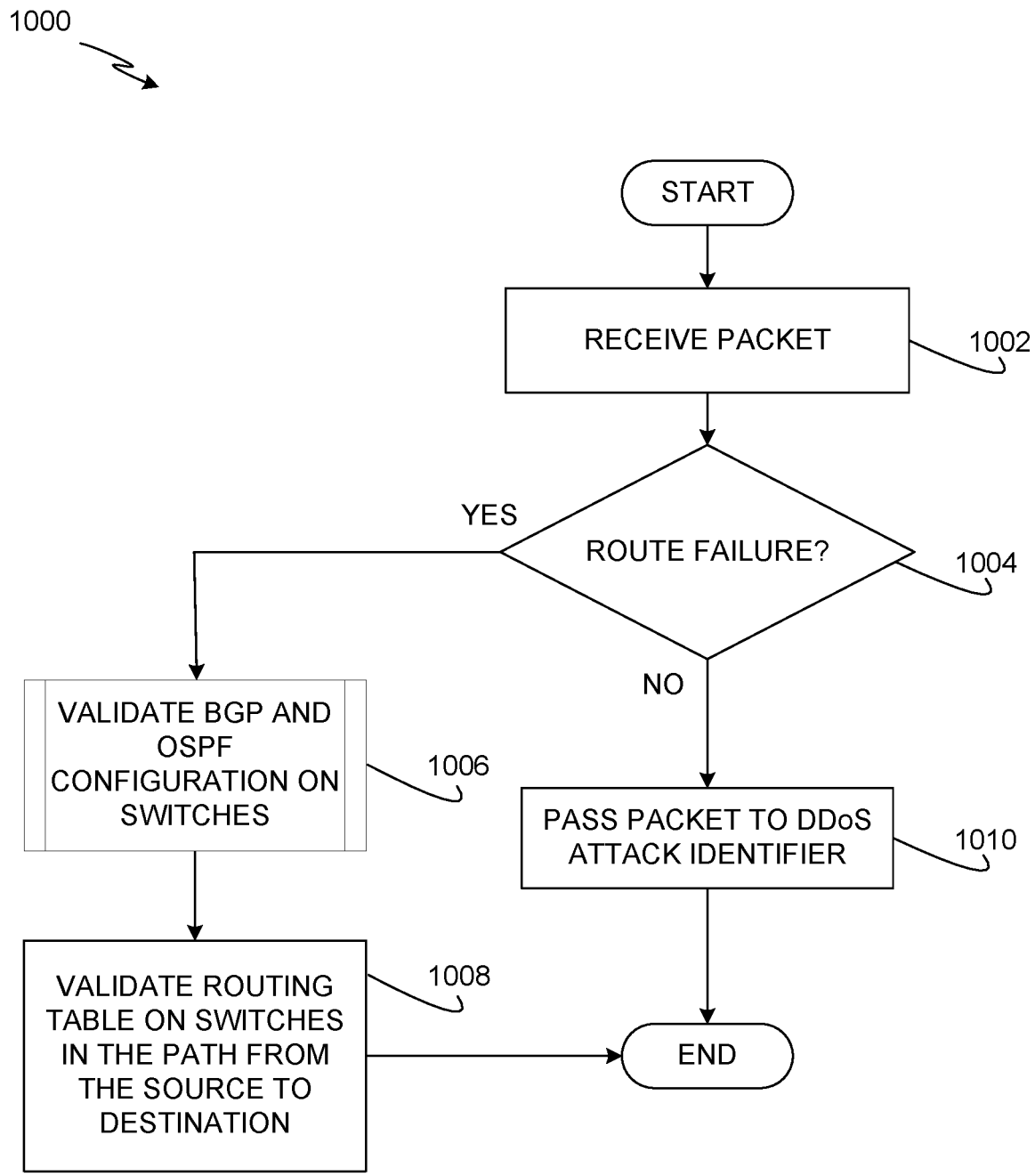
FIG. 10A is a flow chart representative of example machine readable instructions that may be executed to implement the example hardware configuration system of FIG. 1.

FIG. 10A is a flowchart representative of an example method 1000 that may be performed by the example hardware resource configuration system 100 of FIG. 1 to detect route failures in the virtual communication network 500 of FIG. 5. The example method 1000 begins at block 1002 at which the example route failure identifier 140 (see FIG. 1) receives the packet from the example ECMP issue identifier 138. If the example route failure identifier 140 determines the packet was dropped due to a route failure (block 1004), the example route failure identifier 140 passes the packet to the example route failure handler 150 (see FIG. 1), which validates the BGP and the OSPF configuration on the switches (block 1006). Example pseudo-code 1050 (FIG. 10B) that may be performed to implement the example process 1006 of FIG. 10A is shown in FIG. 10B. In some examples, the example route failure handler 150, for each switch, reads BGP/OSPF configuration, verifies neighbor configuration, verifies route-maps, verifies address-family, and verifies AS number. In addition, the example route failure handler 150 validates the routing tables on the switches 106A-C, the ToR switches 210, 212, 216 and 218, and/or the spline switches 222, 222A-D in the communication path between the source and the destination (e.g., the source and the destination identified in the current packet) (block 1008), and the method 1000 ends.

Returning to block 1004, if the example route failure identifier 140 determines that the packet was not dropped due to a route failure (block 1004), the example route failure identifier 140 passes the packet to the example DDoS attack identifier 142 (see FIG. 1) (block 1010), and the method 1000 ends.

FIG. 10B is example pseudo-code representative of an example method 1050 that may be performed by the example hardware resource configuration system 100 of FIG. 1 (e.g., at block 1008 of FIG. 10A) to validate the routing tables on switches (e.g., the switches 106A-C, the ToR switches 210, 212, 216 and 218, and/or the spline switches 222, 222A-D). The example method 1050 begins at line 1052 at which a list of the switches is defined. For each switch S and each router R in the routing table of the switch S (lines 1054), the example route failure handler 150 obtains from the switch S, the subnet of the network of the router R and the next hop for the router R (lines 1056). If the route failure handler 150 determines (e.g., using an example routine of lines 1058) whether the next hop is valid (line 1060). If the routine of lines 1058 returns a failure for any subnet, nexthop combination for any switch S and router R, control exits from the example method 1050 with a failure code (line 1062) (e.g., the routine of lines 1058 returns successfully for all subnet, nexthop combinations for any switch S and router R), control exits successfully from the example method 1050 (line 1064).

Figure 11:
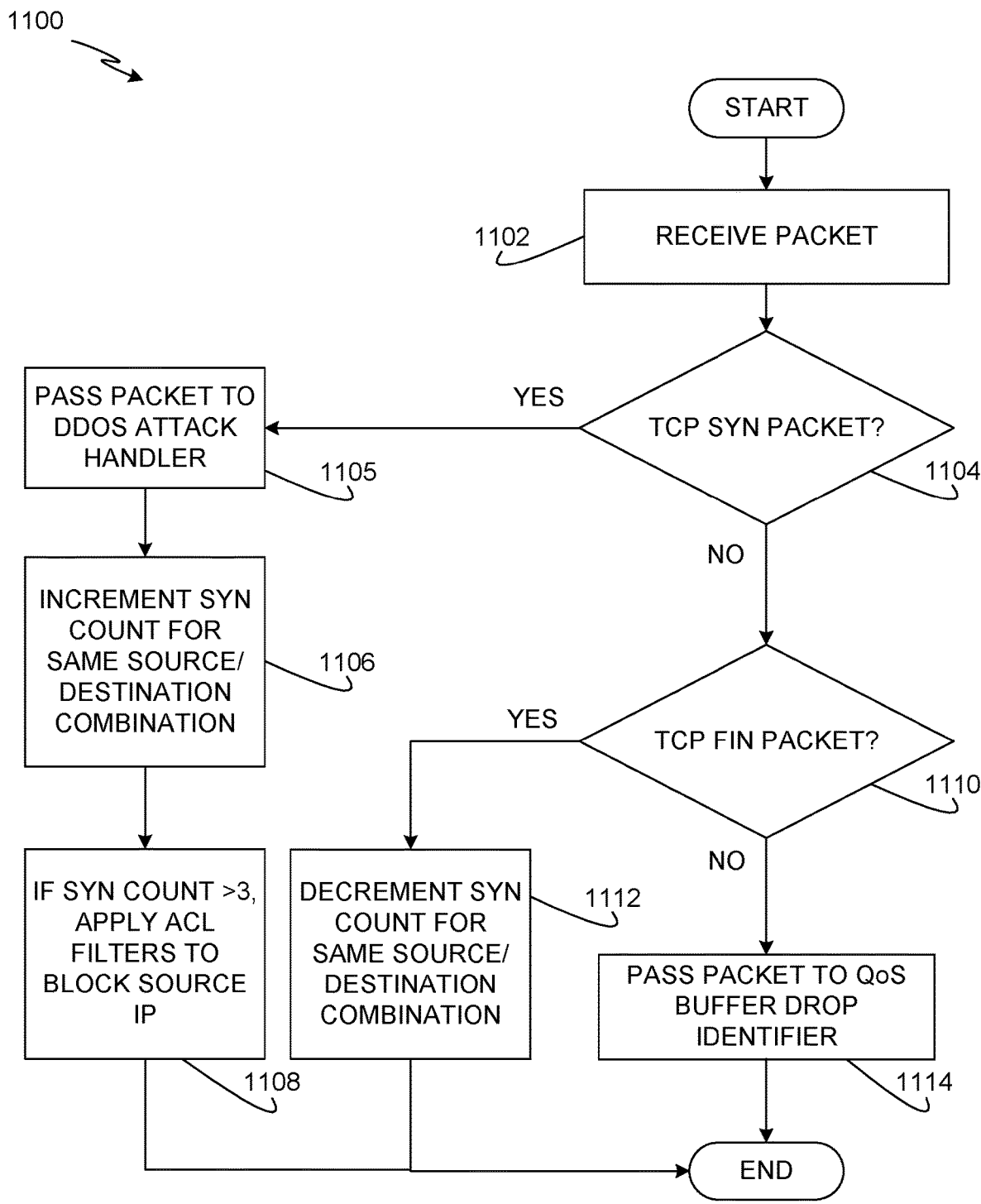
FIG. 11 is a flow chart representative of example machine readable instructions that may be executed to implement the example hardware configuration system of FIG. 1.

FIG. 11 is a flowchart representative of an example method 1100 that may be performed by the example hardware resource configuration system 100 of FIG. 1 to detect DDoS attacks on the virtual communication network 500 of FIG. 5. The example method 1100 begins at the block 1102 at which the example DDoS attack identifier 142 (see FIG. 1) receives the packet from the example route failure identifier 140. If the DDoS attack identifier 142 determines the packet is a TCP SYN packet (block 1104), then the DDoS attack identifier 142 passes the packet to the example DDoS attack handler 152 (see FIG. 1) (block 1105). The example DDoS attack handler 152 increments a SYN count corresponding to the number of received SYN packets associated with the same source and destination as the current packet (block 1106). In addition, when the SYN count is greater than 3, a DDoS attack is assumed to be occurring, and the DDoS attack handler 152 causes the HW resource configuration agents 100 to apply an ACL filter to block further packets transmitted by the source that transmitted the current packet (block 1108), and the method 1100 ends. In some examples, the DDoS attack handler 152 causes the HW resource configuration agents 101 to apply the ACL filter to block further packets from the source.

Returning to block 1104, if the packet is not a TCP SYN packet, the example DDoS attack identifier 142 determines whether the packet is a TCP FIN packet (block 1110). If so (block 1110), the example DDoS attack handler 152 decrements the SYN count for same source/destination combination (block 1112), and the method 1100 ends.

Returning to block 1110, if the packet is neither a TCP SYN or a TCP FIN packet, the example DDoS attack identifier 142 passes the packet to the example QoS buffer drop identifier 144 (see FIG. 1) (block 1114), and the method 1100 ends.

Figure 12:
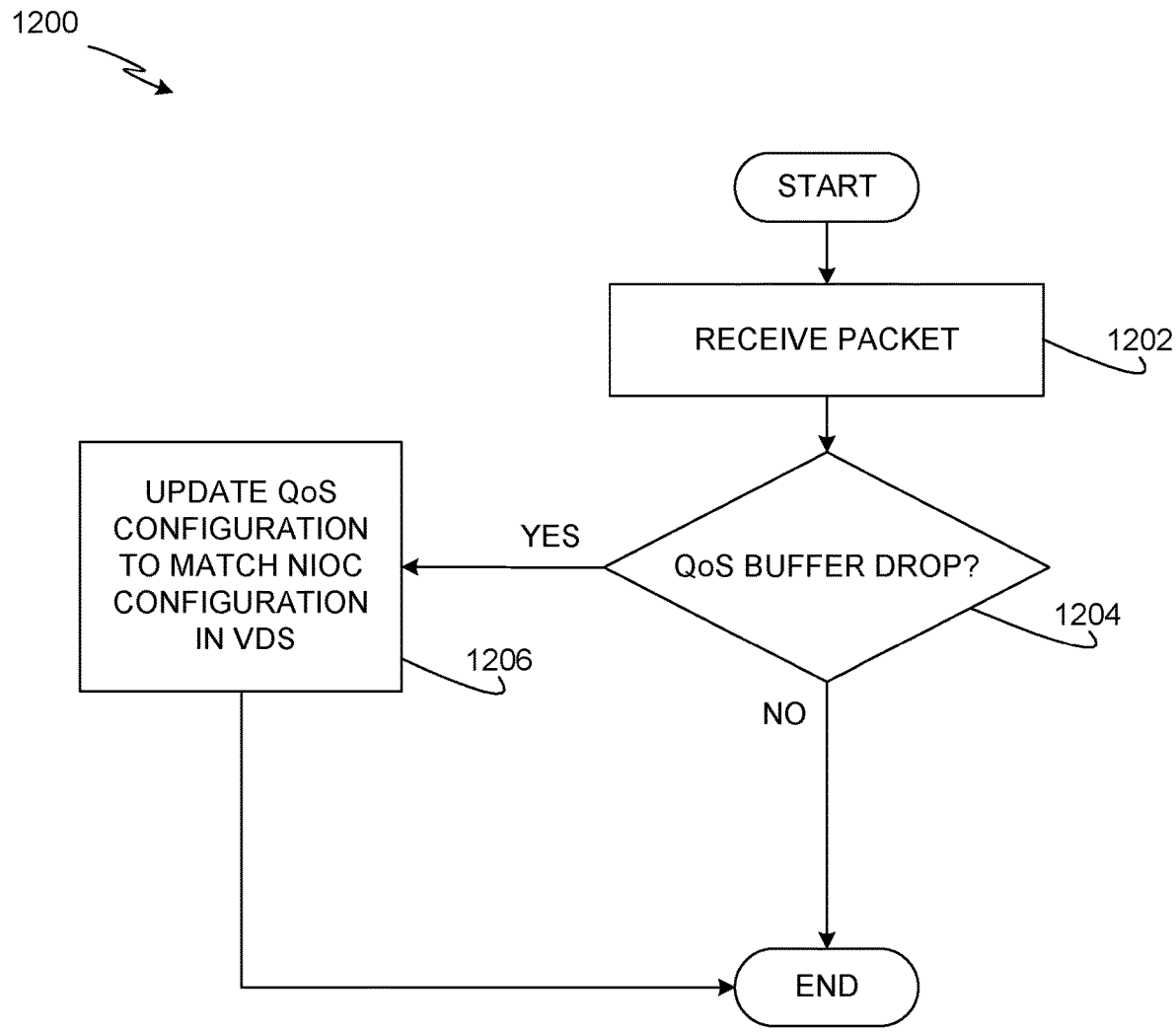
FIG. 12 is a flow chart representative of example machine readable instructions that may be executed to implement the example hardware configuration system of FIG. 1.

FIG. 12 is a flowchart representative of an example method 1200 that may be performed by the example hardware resource configuration system 100 of FIG. 1 to detect DDoS attacks on the virtual communication network 500 of FIG. 5. The example method 1200 begins at the block 1202 at which the example QoS buffer drop identifier 144 (see FIG. 1) receives the packet from the example DDoS attack identifier 142 (block 1202). If the example QoS buffer drop identifier 142 determines the packet was dropped due to a QoS buffer drop (block 1204), the example QoS buffer drop handler 154 updates the QoS configuration to match the network I/O control configuration in the VDS (block 1206), and the method 1200 ends. In some examples, the example QoS buffer drop handler 154 determines the configuration of the network I/O control using the telematics agent 406D (see FIG. 4). In some examples, the example QoS buffer drop handler 154 causes the HW resource configuration agent 101 to update the QoS configuration to match the network I/O control configuration.

Returning to block 1204, if the example QoS buffer drop identifier 142 determines the packet was not dropped due to a QoS buffer drop, the method 1200 ends.

In some examples, the example methods 800-1200 are repeated in the described sequence (or in any sequence) in a repeated fashion to detect packet level issues and modify the hardware switches to improve the virtual communication network 500 of FIG. 5.

Figure 13:
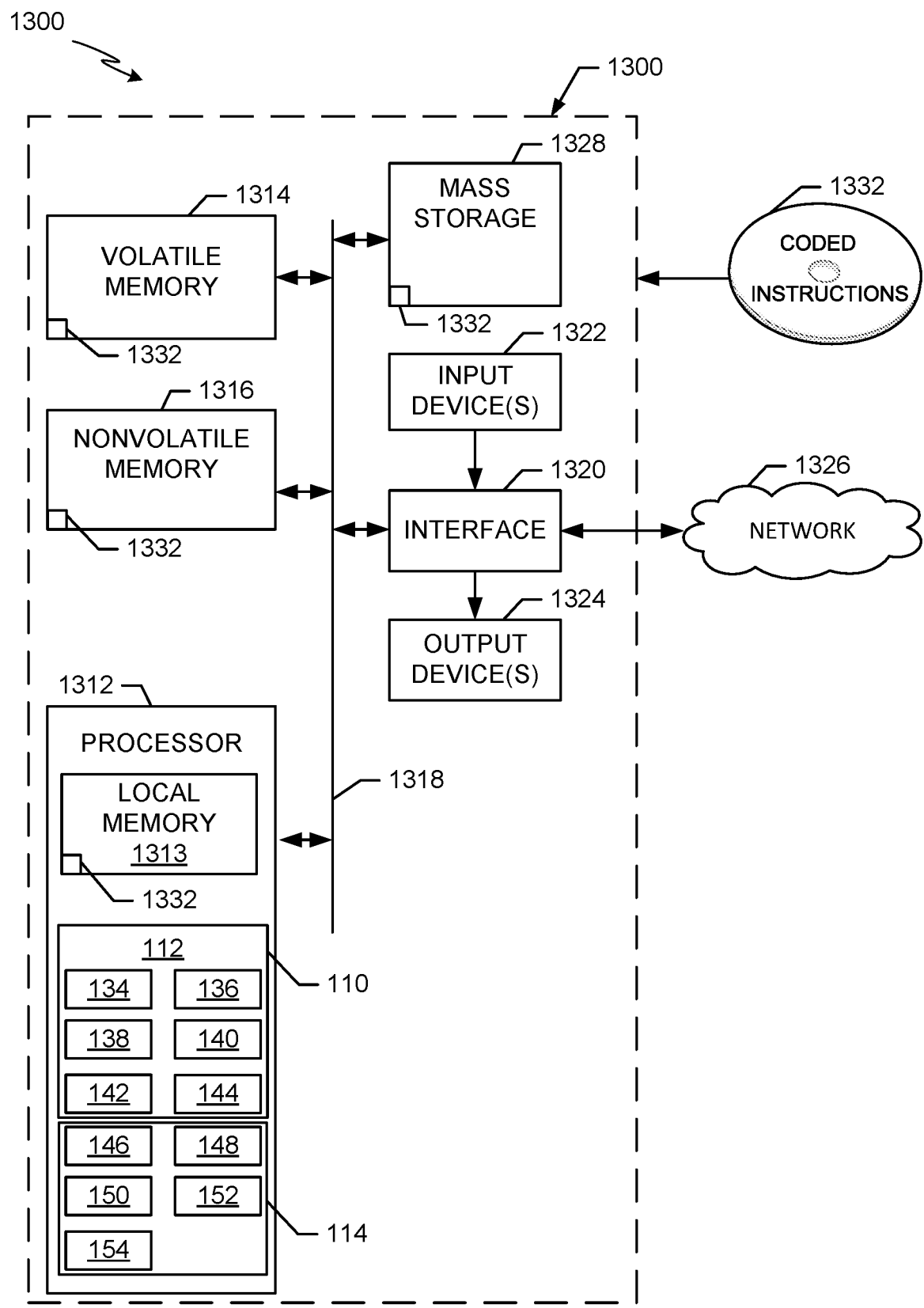
FIG. 13 is a block diagram of an example processor platform capable of executing the instructions of FIGS. 6-12 to implement the example hardware configuration system of FIG. 1.

FIG. 13 is a block diagram of an example processor platform 1300 capable of executing the instructions of FIGS. 6-12 to implement the hardware configuration system of FIG. 1. The processor platform 1300 can be, for example, a server, a personal computer, a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The hardware processor may be a semiconductor based (e.g., silicon based) device. In this example, the processor implements the example packet analyzer 110, the example issue identifier 112, the example packet grabber 134, the example MTU issue identifier 136, the example ECMP issue identifier 138, the example route failure identifier 140, the example DDoS attack identifier 142, the example QoS buffer drop identifier 144, the example issue handler manager 114, the example MTU drop handler 146, the example ECMP issue handler 148, the example route failure handler 150, the example DDoS attack handler 152, and the example QoS buffer drop handler 154.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random-Access Memory (SDRAM), Dynamic Random-Access Memory (DRAM), RAMBUS Dynamic Random-Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and/or commands into the processor 1312 and further permit data to be sensed. The input device(s) can be implemented by, for example, an audio sensor, a microphone, a camera (still or video), a keyboard, a button, a mouse, a touchscreen, a track-pad, a trackball, isopoint and/or a voice recognition system.

One or more output device(s) 1324 are also connected to the interface circuit 1320 of the illustrated example. The output device(s) 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and DVD drives.

The coded instructions 1332 of FIGS. 6-12 may be stored in the mass storage device 1328, in the volatile memory 1314, in the non-volatile memory 1316, and/or on a removable tangible computer readable storage medium such as a CD or DVD.

From the foregoing, it will be appreciated that example methods, apparatus and articles of manufacture have been disclosed that use primitive low-level packet data to make hardware configuration changes to improve a virtual communication network implemented in a virtual rack.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a hardware switch implementing a virtual switch on a virtual communication network;
packet analyzer circuitry to analyze a packet captured at the hardware switch, the packet analyzer circuitry to determine whether the packet is indicative of a packet flow issue affecting transfer of one or more packet flows on the virtual communication network;
issue handler circuitry to, in response to the determination of the packet flow issue by the packet analyzer circuitry:
determine a source internet protocol address and a destination internet protocol address of the packet;
retrieve, from the virtual switch software, at least one virtual local area network (VLAN) associated with at least one of the source internet protocol address and the destination internet protocol address;
retrieve a setting from the virtual switch software of a hypervisor managing a software-defined network;
determine a modification to a configuration of the hardware switch based on the setting;
a hardware resource configuration agent to modify a configuration of at least one hardware switch associated with the at least one VLAN including the hardware switch based on the modification determined by the issue handler circuitry.

2. The apparatus of claim 1, wherein the packet analyzer circuitry is further to identify a cause of the packet flow issue, the cause of the packet flow issue being at least one of:
a maximum transmission unit mismatch between two or more links of a communication path of packet;
an incorrect equal cost multi-path algorithm applied to the two or more links of the communication path;
a distributed denial of service attack directed at a destination server of the virtual communication network;
a route failure on at least one link of the communication path; and
a quality of service buffer drop occurring on one or more interfaces of the communication path.

3. The apparatus of claim 2, wherein the cause of the packet flow issue is the maximum transmission unit mismatch, and the issue handler circuitry causes the hardware resource configuration agent to modify the configuration of the hardware switch by determining a port-group identifier of the virtual switch based on a source and a destination of the packet, determining a maximum transmission unit size of the virtual switch based on the port-group identifier, and configuring the switch to use the maximum transmission unit size.

4. The apparatus of claim 2, wherein the cause of the packet flow issue is the equal cost multi-path algorithm, and the issue handler circuitry causes the hardware resource configuration agent to modify the configuration of the hardware switch by adjusting the incorrect equal-cost multi-path algorithm of at least one of the two or more of links of the communication path.

5. The apparatus of claim 2, wherein the packet is a first packet, the cause of the packet flow issue is the distributed denial of service attack, and the issue handler circuitry causes the hardware resource configuration agent to modify the configuration of the hardware switch by blocking the transmission of additional packets from a source address, the source address being included in the first packet.

6. The apparatus of claim 2, wherein the cause of the packet flow issue is the route failure, and the issue handler circuitry causes the hardware resource configuration agent to modify the configuration of the hardware switch by validating one or more routing tables of the hardware switch.

7. The apparatus of claim 2, wherein the cause of the packet flow issue is the quality of service buffer drop, and the issue handler circuitry causes the hardware resource configuration agent to modify the configuration of the hardware switch by updating a first quality of service configuration of the hardware switch to match a second quality of service configuration of a network input/output controller of the virtual switch.

8. The apparatus of claim 1, wherein the issue handler circuitry causes the hardware resource configuration agent to perform the modification.

9. The apparatus of claim 1, wherein the issue handler circuitry determines the modification to the configuration of the hardware switch based on the configuration of the virtual switch.

10. The apparatus of claim 1, wherein the virtual switch is a distributed virtual switch.

11. The apparatus of claim 1, wherein the configuration of the virtual communication network includes a maximum transmission unit (MTU) size, an equal cost multi-path (ECMP) routing parameter, a route configuration, a routing table, a quality-of-service (QoS) parameter, a network input/output control (NIOC) configuration, an internet control message protocol (ICMP) configuration, a virtual private cloud (VPC) configuration, a multi-chassis link aggregation (MPAG) configuration, a border gateway protocol (BGP) configuration, an open shortest path first (OSPF) configuration, or a distributed denial of service (DDoS) configuration.

12. A method, comprising:
analyzing a packet captured at a hardware switch to determine whether the packet is indicative of a packet flow issue affecting transfer of one or more packet flows on a virtual communication network;
in response to the determining of whether the packet is indicative of a packet flow issue:
determining a source internet protocol address and a destination internet protocol address of the packet;
retrieving, from the virtual switch software, at least one virtual local area network (VLAN) associated with at least one of the source internet protocol address and the destination internet protocol address;
retrieving a setting from the virtual switch software of a hypervisor managing a software-defined network;
determining a modification to the setting;
and
modifying a configuration of at least one hardware switch associated with the at least one VLAN including the hardware switch based on the determined modification.

13. The method of claim 12, further including identifying a cause of the packet flow issue to be at least one of a maximum transmission unit mismatch between two or more links of a communication path of the packet, an incorrect equal-cost multi-path routing algorithm being applied to the two or more links of the communication path, a distributed denial of service attack directed at a destination server of the virtual communication network, a route failure on at least one link of the communication path, and a quality of service buffer drop occurring on one or more interfaces of the communication path.

14. The method of claim 13, wherein the cause of the packet flow issue is the maximum transmission unit mismatch, and the modifying of the configuration of the hardware switch includes:
determining a port-group identifier of the virtual switch based on a source and a destination of the packet; and
determining a maximum transmission unit size of the virtual switch based on the port-group identifier, and configuring the hardware switch to use the maximum transmission unit size.

15. The method of claim 13, wherein the cause of the packet flow issue is the equal cost multi-path algorithm, and the modifying of the configuration of the hardware switch includes adjusting the incorrect equal-cost multi-path routing algorithm of at least one of the two or more of links of the communication path.

16. The method of claim 13, wherein the packet is a first packet, and the cause of the packet flow issue is the distributed denial of service attack, and the modifying of the configuration of the hardware switch includes blocking the transmission of additional packets from a source address, the source address being included in the first packet.

17. The method of claim 13, wherein the cause of the packet flow issue is the route failure, and the modifying of the configuration of the hardware switch includes validating one or more routing tables of the hardware switch.

18. The method of claim 13, wherein the cause of the packet flow issue is the quality of service buffer drop, and the modifying of the configuration of the hardware switch includes updating a first quality of service configuration of the hardware switch to match a second quality of service configuration of a network input/output controller of the virtual switch.

19. The method of claim 13, wherein the configuration of the virtual communication network includes a maximum transmission unit (MTU) size, an equal cost multi-path (ECMP) routing parameter, a route configuration, a routing table, a quality-of-service (QoS) parameter, a network input/output control (NIOC) configuration, an internet control message protocol (ICMP) configuration, a virtual private cloud (VPC) configuration, a multi-chassis link aggregation (MPAG) configuration, a border gateway protocol (BGP) configuration, an open shortest path first (OSPF) configuration, or a distributed denial of service (DDoS) configuration.

20. A non-transitory computer-readable storage medium comprising instructions that, when executed, cause one or more processors to perform at least the operations of:
analyzing packet captured at a hardware switch to determine whether the packet is indicative of a packet flow issue affecting transfer of one or more packet flows on a virtual communication network;
in response to the determining of whether the packet is indicative of a packet flow issue:
determining a source internet protocol address and a destination internet protocol address of the packet;
retrieving, from the virtual switch software, at least one virtual local area network (VLAN) associated with at least one of the source internet protocol address and the destination internet protocol address;
retrieving a setting from the virtual switch software of a hypervisor managing a software-defined network;
determining a modification to a configuration of the hardware switch based on the setting;
and
modifying a configuration of at least one hardware switch associated with the at least one VLAN including the hardware switch based on the determined modification.

21. The non-transitory computer-readable storage medium of claim 20, wherein the operations further include identifying a cause of the packet flow issue to be at least one of a maximum transmission unit mismatch among two or more links of a communication path traveled by the packet, an incorrect equal-cost multi-path routing algorithm being applied to the two or more links of the communication path, a distributed denial of service attack directed at a destination server of the virtual communication network, a route failure on at least one link of the communication path, and a quality of service buffer drop occurring on one or more interfaces of the communication path.

22. The non-transitory computer-readable storage medium of claim 20, wherein the configuration of the virtual communication network includes a maximum transmission unit (MTU) size, an equal cost multi-path (ECMP) routing parameter, a route configuration, a routing table, a quality-of-service (QoS) parameter, a network input/output control (NIOC) configuration, an internet control message protocol (ICMP) configuration, a virtual private cloud (VPC) configuration, a multi-chassis link aggregation (MPAG) configuration, a border gateway protocol (BGP) configuration, an open shortest path first (OSPF) configuration, or a distributed denial of service (DDoS) configuration.

* * * * *